United States Patent
Forghani et al.

(10) Patent No.: US 11,390,380 B2
(45) Date of Patent: Jul. 19, 2022

(54) SYSTEM AND METHOD FOR ALLEVIATING STRUCTURAL LOADS ON A PIVOTING MAIN LANDING GEAR OF AN AIRCRAFT IN A PIVOT TURN MANEUVER

(71) Applicant: The Boeing Company, Chicago, IL (US)

(72) Inventors: Nima Forghani, Seattle, WA (US); David T. Yamamoto, Mill Creek, WA (US); Levi A. Mulkey, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 385 days.

(21) Appl. No.: 16/598,325

(22) Filed: Oct. 10, 2019

(65) Prior Publication Data
US 2021/0107634 A1    Apr. 15, 2021

(51) Int. Cl.
*B64C 25/48* (2006.01)
*B60T 8/17* (2006.01)
(Continued)

(52) U.S. Cl.
CPC .......... *B64C 25/48* (2013.01); *B60T 8/1703* (2013.01); *B60T 8/325* (2013.01); *B64C 25/426* (2013.01); *B64C 25/46* (2013.01)

(58) Field of Classification Search
CPC ....... B64C 25/48; B64C 25/426; B64C 25/46; B64C 25/34; B64C 25/42; B64C 25/44; B60T 8/1703; B60T 8/325
See application file for complete search history.

(56) References Cited

U.S. PATENT DOCUMENTS

| | | | | |
|---|---|---|---|---|
| 1,573,100 A | * | 2/1926 | Sperry | B64C 25/48 |
| | | | | 188/77 R |
| 2,444,927 A | * | 7/1948 | Gallagher | B64C 25/48 |
| | | | | 303/9.61 |

(Continued)

FOREIGN PATENT DOCUMENTS

| | | | | |
|---|---|---|---|---|
| DE | 1756129 A1 | | 2/1970 | |
| EP | 0836990 A2 | * | 9/1997 | B64C 25/34 |

(Continued)

OTHER PUBLICATIONS

Federal Register, vol. 79, No. 113, Jun. 12, 2014, Rules and Regulations, Department of Transportation, Federal Aviation Administration, 14 CFR Part 25, "Special Conditions: Airbus Model A350-900 Series Airplane; Ground Pivoting Loads", pp. 33674-33675.

(Continued)

*Primary Examiner* — Behrang Badii
*Assistant Examiner* — Jalal C Coduroglu

(57) ABSTRACT

There is provided a pivot turn load alleviation (PTLA) brake system for alleviating structural loads on a pivoting main landing gear of an aircraft in a pivot turn maneuver. The PTLA brake system includes a brake control system operatively coupled to at least two main landing gear, each having two or more wheels. The PTLA brake system further includes a PTLA brake inhibit subsystem coupled to the brake control system. The subsystem inhibits braking of one or more of the two or more wheels of the pivoting main landing gear, in the pivot turn maneuver, so that at least one wheel of the two or more wheels is in an unbraked state, and a remaining number of the two or more wheels are in a braked state. The PTLA brake system alleviates structural loads, and reduces wear on the at least one wheel that is in the unbraked state.

20 Claims, 13 Drawing Sheets

(51) Int. Cl.
  *B60T 8/32* (2006.01)
  *B64C 25/42* (2006.01)
  *B64C 25/46* (2006.01)

(56) References Cited

U.S. PATENT DOCUMENTS

| | | | | |
|---|---|---|---|---|
| 5,968,106 | A * | 10/1999 | DeVlieg | B60T 7/22 |
| | | | | 244/183 |
| 6,342,021 | B1 * | 1/2002 | Gleasman | B62D 11/14 |
| | | | | 475/28 |
| 7,300,020 | B2 | 11/2007 | Steiner et al. | |
| 7,766,431 | B2 | 8/2010 | Griffith et al. | |
| 8,376,273 | B2 * | 2/2013 | Thompson | B64C 25/48 |
| | | | | 244/110 A |
| 2006/0186267 | A1 * | 8/2006 | Steiner | B60T 8/1703 |
| | | | | 244/110 A |
| 2008/0283660 | A1 * | 11/2008 | Thompson | B60T 8/00 |
| | | | | 244/110 A |
| 2009/0069958 | A1 * | 3/2009 | Regis | B60T 8/1703 |
| | | | | 701/3 |
| 2010/0222942 | A1 * | 9/2010 | DeVlieg | B60T 8/00 |
| | | | | 701/3 |
| 2013/0168499 | A1 * | 7/2013 | Grossman | B64D 37/04 |
| | | | | 244/135 A |
| 2015/0088371 | A1 * | 3/2015 | Kanemori | B64C 25/42 |
| | | | | 701/33.9 |
| 2015/0151835 | A1 * | 6/2015 | Cox | B64C 25/405 |
| | | | | 244/50 |
| 2018/0122250 | A1 * | 5/2018 | Wapenski | B64C 25/426 |
| 2018/0216988 | A1 * | 8/2018 | Nance | B64C 25/001 |
| 2018/0339767 | A1 * | 11/2018 | Cox | F16D 9/06 |

FOREIGN PATENT DOCUMENTS

| | | | | |
|---|---|---|---|---|
| EP | 3342701 | A1 * | 7/2018 | B60L 7/26 |
| EP | 3345828 | A1 * | 7/2018 | B64C 25/22 |
| GB | 2524092 | A * | 9/2015 | B64C 25/34 |
| RU | 2345916 | C1 * | 2/2009 | |
| WO | WO-2005022098 | A1 * | 3/2005 | B64C 25/46 |
| WO | WO-2006024146 | A1 * | 3/2006 | G01B 11/306 |
| WO | 2007054715 | A1 | 5/2007 | |
| WO | WO-2007054715 | A1 * | 5/2007 | B60T 8/00 |
| WO | 2010088396 | A1 | 8/2010 | |
| WO | WO-2010088396 | A1 * | 8/2010 | B60T 8/00 |
| WO | WO-2019005467 | A2 * | 1/2019 | B62M 9/00 |

OTHER PUBLICATIONS

Extended European Search Report (EESR), European Patent Office, dated Feb. 12, 2021, for Application No. EP20194098.8, Applicant The Boeing Company, 8 pages.

* cited by examiner

SYSTEM AND METHOD FOR ALLEVIATING STRUCTURAL LOADS ON A PIVOTING MAIN LANDING GEAR OF AN AIRCRAFT IN A PIVOT TURN MANEUVER

FIELD

The disclosure relates generally to systems and methods for braking aircraft, and more particularly, to systems and methods for braking pivoting main landing gear of aircraft in and during a pivot turn maneuver.

BACKGROUND

Large transport aircraft, both commercial and military, typically include a main landing gear arrangement that supports most of the aircraft weight, along with a nose gear for stability and steering. The main landing gear usually includes a left main landing gear and a right main landing gear, each having multiple wheels, and each wheel including one or more brakes.

The wheel brakes on the main landing gear are controlled by the pilot after landing to assist in the ground deceleration of the aircraft. The wheel brakes can also be controlled by the pilot during ground taxi maneuvers, and pivot turn maneuvers or 2-point turn maneuvers performed on the ground. The large mass of an aircraft and the high landing speed results in very high momentum, which can translate to very high structural loads during braking maneuvers, for example, when the brakes are applied suddenly.

Known systems and methods exist for braking main landing gear during a pivot turn maneuver. However, such known systems and methods brake all of the wheels on a pivoting main landing gear. Braking all of the wheels on the pivoting main landing gear during a pivot turn maneuver may result in excessive wear on the wheels and tires, and increased structural loads and braking loads on the pivoting main landing gear. Moreover, known systems and methods may require the use of heavy and bulky main landing gear assemblies and components to withstand the high structural loads and braking loads experienced during a pivot turn maneuver.

Accordingly, there is a need in the art for systems and methods that avoid braking all of the wheels on a pivoting main landing gear and that allow certain wheels on a pivoting main landing gear to roll freely during a pivot turn maneuver, and that reduce structural loads on a pivoting main landing gear during a pivot turn maneuver, and that reduce the weight of main landing gear assemblies and components designed to withstand high loads during a pivot turn maneuver, and that provide significant advantages over known systems and methods.

SUMMARY

Example implementations of this disclosure provide systems and methods for braking pivoting main landing gear of aircraft in and during a pivot turn maneuver. As discussed in the below detailed description, versions of the systems and methods may provide significant advantages over existing systems and methods.

In one exemplary version, there is provided a pivot turn load alleviation (PTLA) brake system for alleviating structural loads on a pivoting main landing gear of an aircraft in a pivot turn maneuver. The PTLA brake system comprises a brake control system operatively coupled to at least two main landing gear. Each of the at least two main landing gear has two or more wheels. The brake control system controls braking of the at least two main landing gear.

The PTLA brake system further comprises a pivot turn load alleviation (PTLA) brake inhibit subsystem coupled to the brake control system. The PTLA brake inhibit subsystem inhibits braking of one or more of the two or more wheels of one main landing gear comprising the pivoting main landing gear, in the pivot turn maneuver, so that at least one wheel of the two or more wheels is in an unbraked state, and a remaining number of the two or more wheels are in a braked state. The PTLA brake system alleviates the structural loads on the pivoting main landing gear of the aircraft in the pivot turn maneuver, and reduces wear on the at least one wheel that is in the unbraked state.

In another version, there is provided an aircraft. The aircraft comprises a fuselage, one or more wings attached to the fuselage, and a plurality of landing gear attached to the fuselage. The plurality of landing gear comprises a nose landing gear, and at least two main landing gear. Each of the at least two main landing gear has two or more wheels. During a pivot turn maneuver by the aircraft, one of the at least two main landing gear comprises a pivoting main landing gear.

The aircraft further comprises a pivot turn load alleviation (PTLA) brake system. The PTLA brake system comprises a brake control system operatively coupled to the at least two main landing gear. The brake control system controls braking of the at least two main landing gear.

The PTLA brake system further comprises a pivot turn load alleviation (PTLA) brake inhibit subsystem coupled to the brake control system. The PTLA brake inhibit subsystem inhibits braking of one or more of the two or more wheels of one main landing gear comprising the pivoting main landing gear, during the pivot turn maneuver, so that at least one wheel of the two or more wheels is in an unbraked state, and a remaining number of the two or more wheels are in a braked state. The PTLA brake system alleviates structural loads on the pivoting main landing gear, during the pivot turn maneuver by the aircraft, and reduces wear on the at least one wheel that is in the unbraked state.

In another version, there is provided a method for alleviating structural loads on a pivoting main landing gear of an aircraft in a pivot turn maneuver. The method comprises the step of initiating the pivot turn maneuver with the aircraft. The aircraft has a pivot turn load alleviation (PTLA) brake system. The PTLA brake system comprises a brake control system operatively coupled to at least two main landing gear. Each of the at least two main landing gear has two or more wheels. The brake control system controls braking of the at least two main landing gear. The PTLA brake system further comprises a pivot turn load alleviation (PTLA) brake inhibit subsystem coupled to the brake control system.

The method further comprises the step of activating a pivot turn load alleviation (PTLA) brake inhibit command of the PTLA brake inhibit subsystem, to one or more brake control units of the brake control system, upon meeting one or more brake inhibit conditions. The method further comprises the step of inhibiting braking of one or more of the two or more wheels of the pivoting main landing gear, in the pivot turn maneuver, so that at least one wheel of the two or more wheels is in an unbraked state, and a remaining number of the two or more wheels are in a braked state. The PTLA brake system alleviates the structural loads on the pivoting main landing gear of the aircraft in the pivot turn maneuver, and reduces wear on the at least one wheel that is in the unbraked state.

The features, functions, and advantages that have been discussed can be achieved independently in various versions of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein.

The Figures shown in this disclosure represent various aspects of the versions presented, and only differences will be discussed in detail.

DETAILED DESCRIPTION

Disclosed versions or examples will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
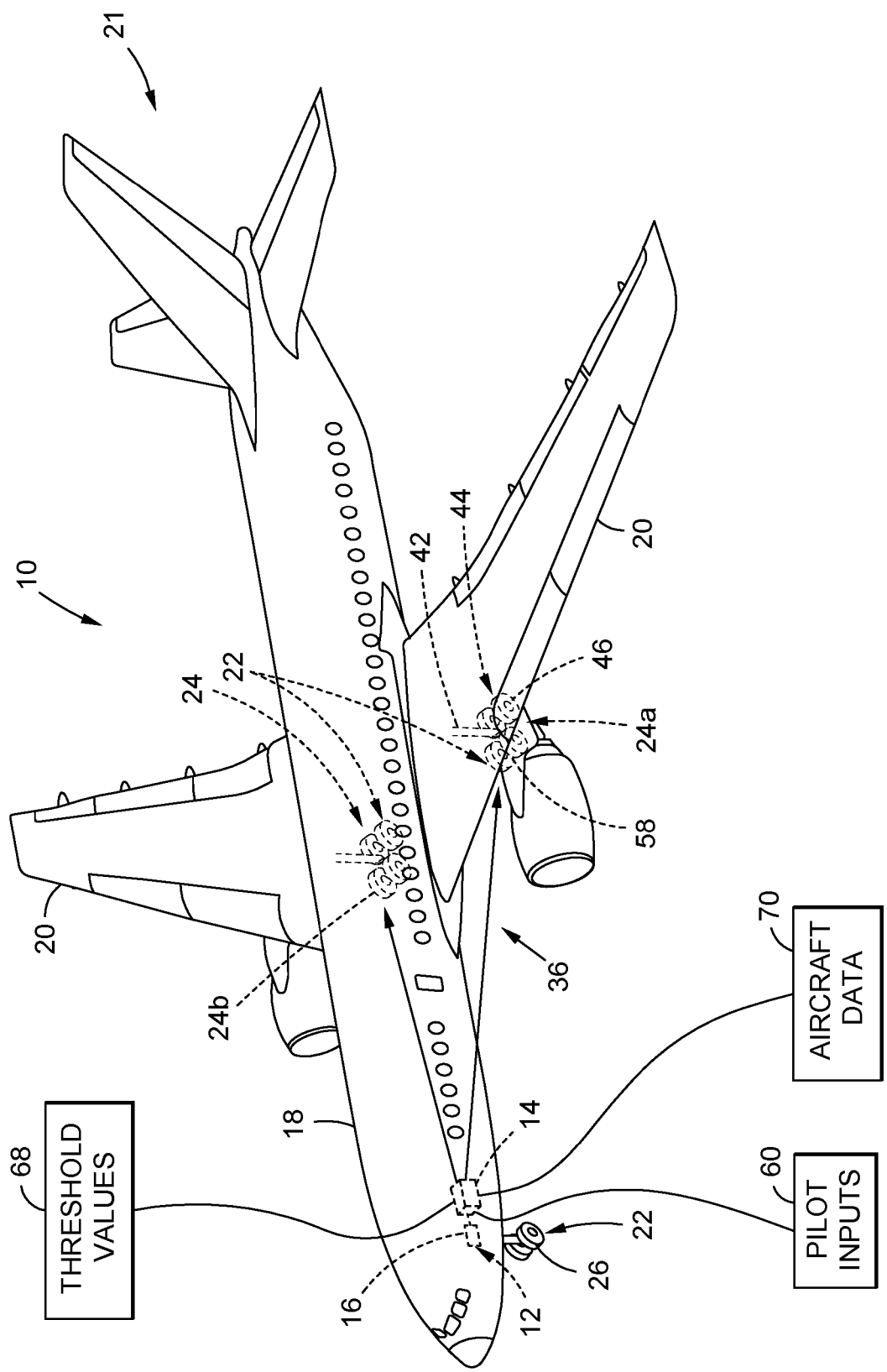
FIG. 1A is an illustration of a perspective view of an aircraft having a pivot turn load alleviation (PTLA) brake system in accordance with a version of the disclosure.
Figure 1B:
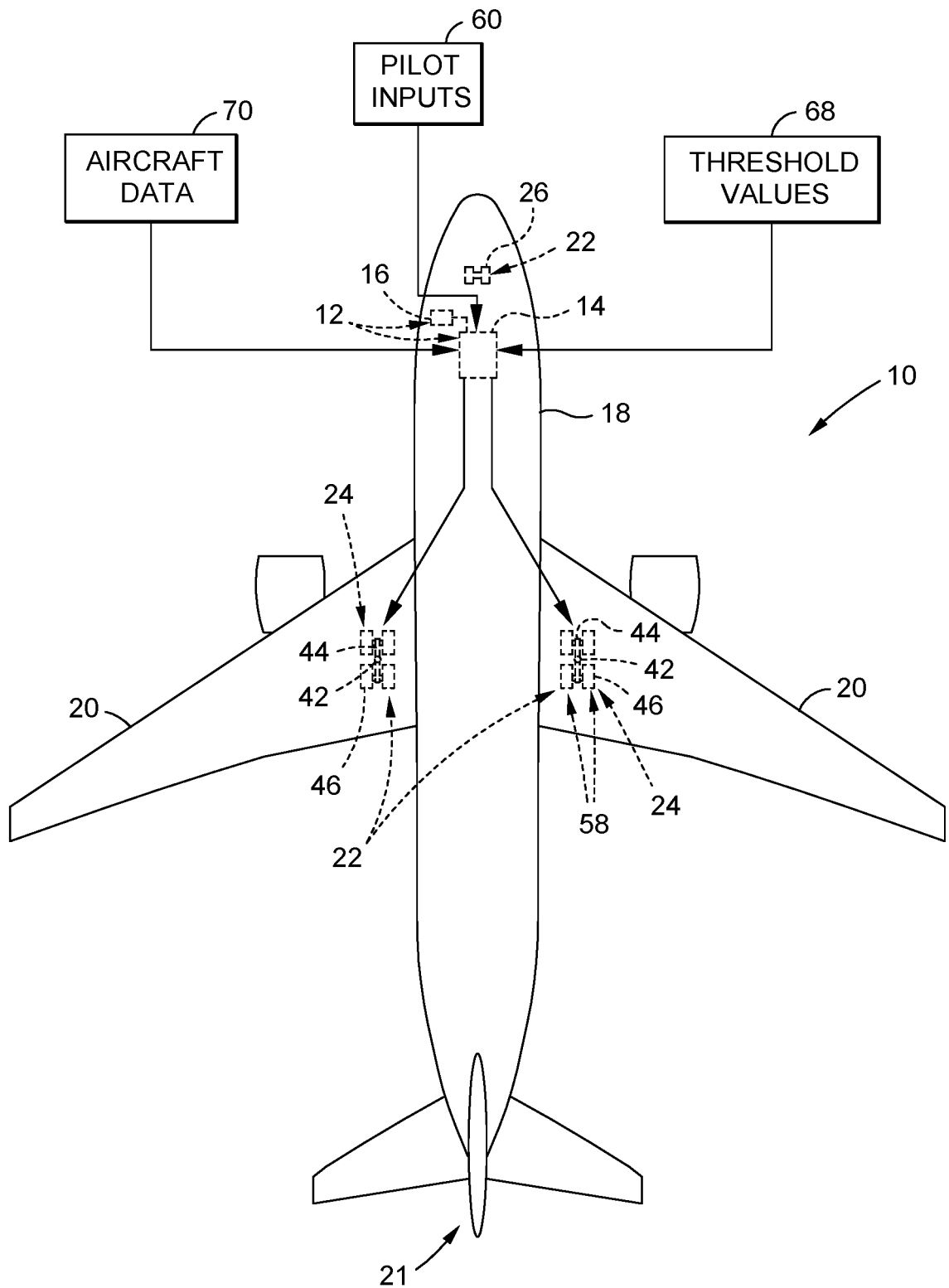
FIG. 1B is an illustration of a top plan view of the aircraft and PTLA brake system of FIG. 1A.
Figure 2A:
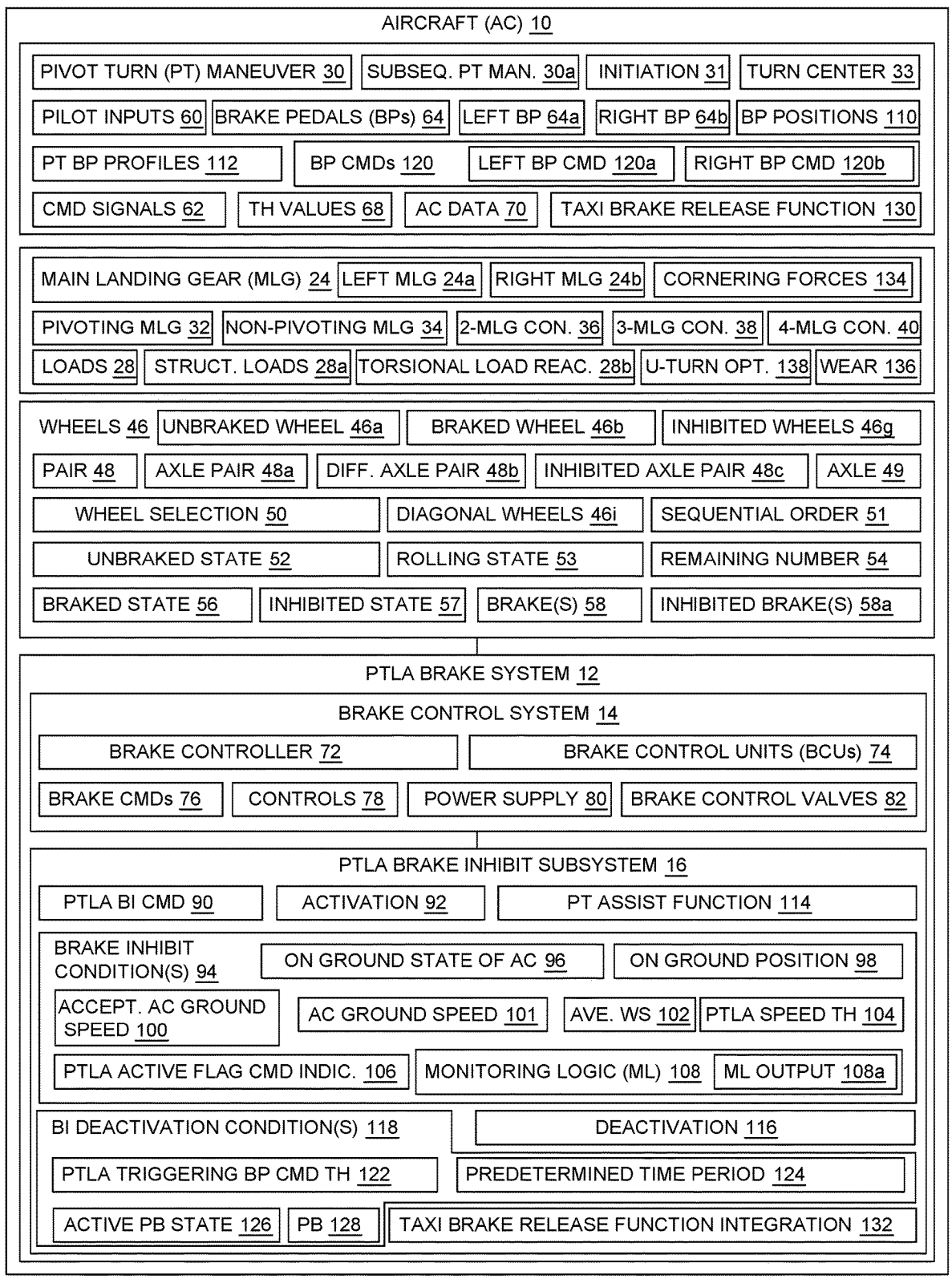
FIG. 2A is an illustration of a functional block diagram showing an aircraft with an exemplary PTLA brake system of the disclosure.

Now referring to the Figures, FIG. 1A is an illustration of a perspective view of an aircraft 10 having a pivot turn load alleviation (PTLA) brake system 12 configured in accordance with a version of the disclosure, and FIG. 1B is an illustration of a top plan view of the aircraft 10 and the PTLA brake system 12 of FIG. 1A. FIG. 2A is an illustration of a functional block diagram showing the aircraft 10 with an exemplary PTLA brake system 12 of the disclosure.

The blocks in FIG. 2A represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

As shown in FIGS. 1A-1B, and 2A, the PTLA brake system 12 comprises a brake control system 14 and a pivot turn load alleviation (PTLA) brake inhibit subsystem 16 coupled to the brake control system 14. As shown in FIGS. 1A-1B, the aircraft 10 includes a fuselage 18 with one or more wings 20 coupled to the fuselage 18, and a tail 21. The aircraft 10 can be supported at multiple points via landing gear 22 (see FIGS. 1A, 1B, 2A), including main landing gear (MLG) 24 (see FIGS. 1A-1B, 2A) and a nose landing gear 26 (see FIGS. 1A-1). As shown in FIGS. 1A-1B, the main landing gear 24 is positioned aft of the nose landing gear 26, and the main landing gear 24 includes a left main landing gear 24a and a right main landing gear 24b.

In one version disclosed herein, there is provided the PTLA brake system 12 for alleviating loads 28 (see FIG. 2A), such as structural loads 28a (see FIG. 2A), on at least one main landing gear 24 comprising a pivoting main landing gear 32 (see FIG. 2A) of the aircraft 10 in a pivot turn maneuver 30 (see FIG. 2A), or during a pivot turn maneuver 30, that is executed or performed by the aircraft 10. During the pivot turn maneuver 30, for example, if the aircraft 10 has two main landing gear 24, one main landing gear 24 comprises the pivoting main landing gear 32 (see FIG. 2A) and the other main landing gear 24 (see FIG. 2A) comprises a non-pivoting main landing gear 34. The pivoting main landing gear 32 is closer to a turn center 33 (see FIG. 2A) of the pivot turn maneuver 30, or pivot turn, than the non-pivoting main landing gear 34. The pivoting main landing gear 32 is closest or nearest to the turn center 33 of the pivot turn maneuver 30, or pivot turn. Torsion is high when pivoting near the center of the pivoting main landing gear 32. During the pivot turn maneuver 30, one main landing gear 24 is braking and being pivoted about, and the other main landing gear 24 is moving circumferentially about the braked main landing gear 24. Typically there are two brake pedals 64 (see FIG. 2A), such as a left brake pedal 64a (see FIG. 2A) and a right brake pedal 64b (see FIG. 2A), with each brake pedal 64 commanding a different main landing gear 24, and each brake pedal 64 may be operated by different pilots 154 (see FIG. 2B).

As shown in FIG. 1A, the main landing gear 24 is a 2-main landing gear configuration 36 (see also FIG. 2A). Although the main landing gear 24 shown in FIG. 1A is a 2-main landing gear configuration 36, the PTLA brake system 12 may also be used with a 3-main landing gear configuration 38 (see FIG. 2A), a 4-main landing gear configuration 40 (see FIG. 2A), or another suitable main landing gear configuration.

Figure 3A:
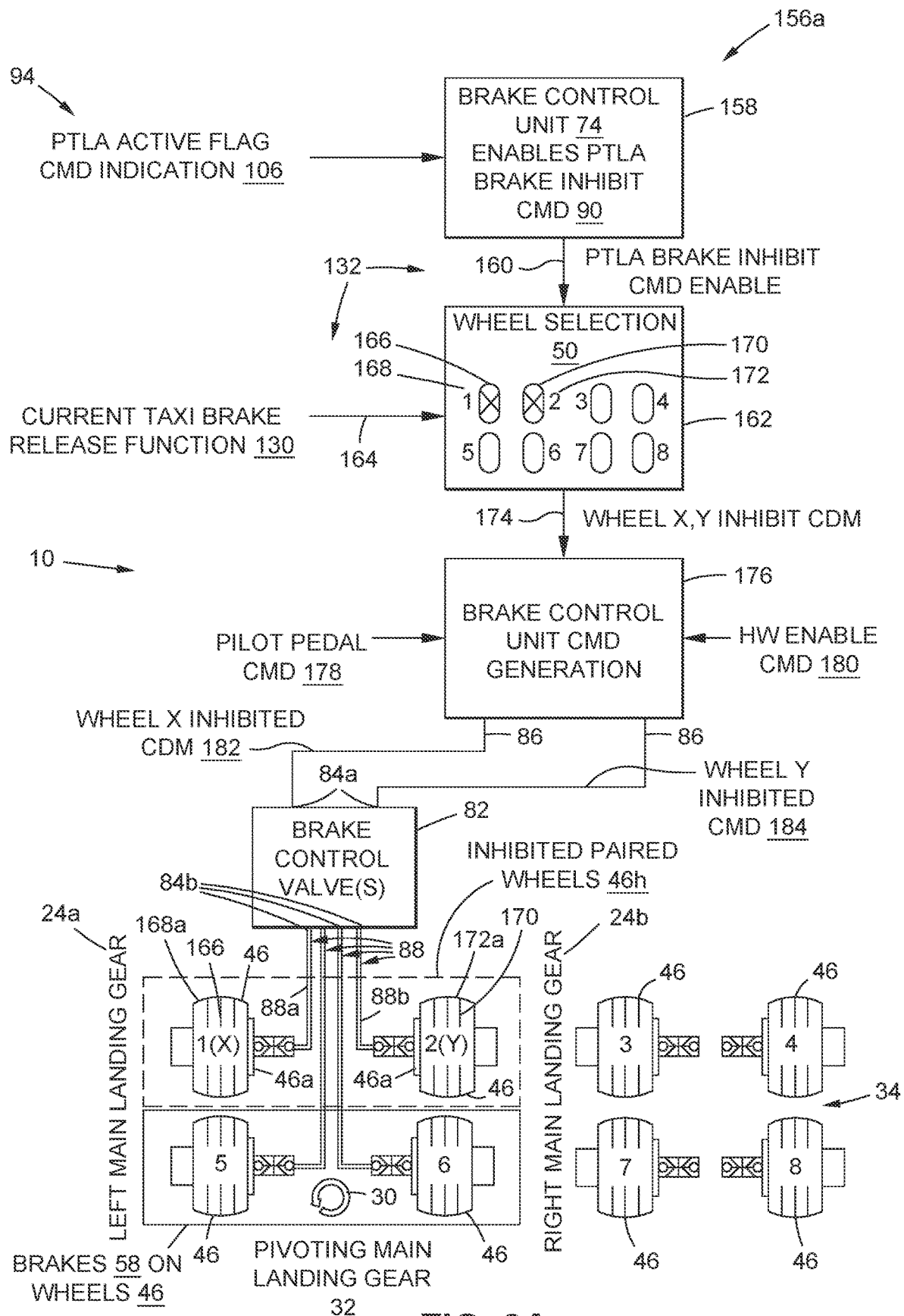
FIG. 3A is an illustration of schematic drawing of one version of a PTLA brake system command logic diagram.
Figure 3B:
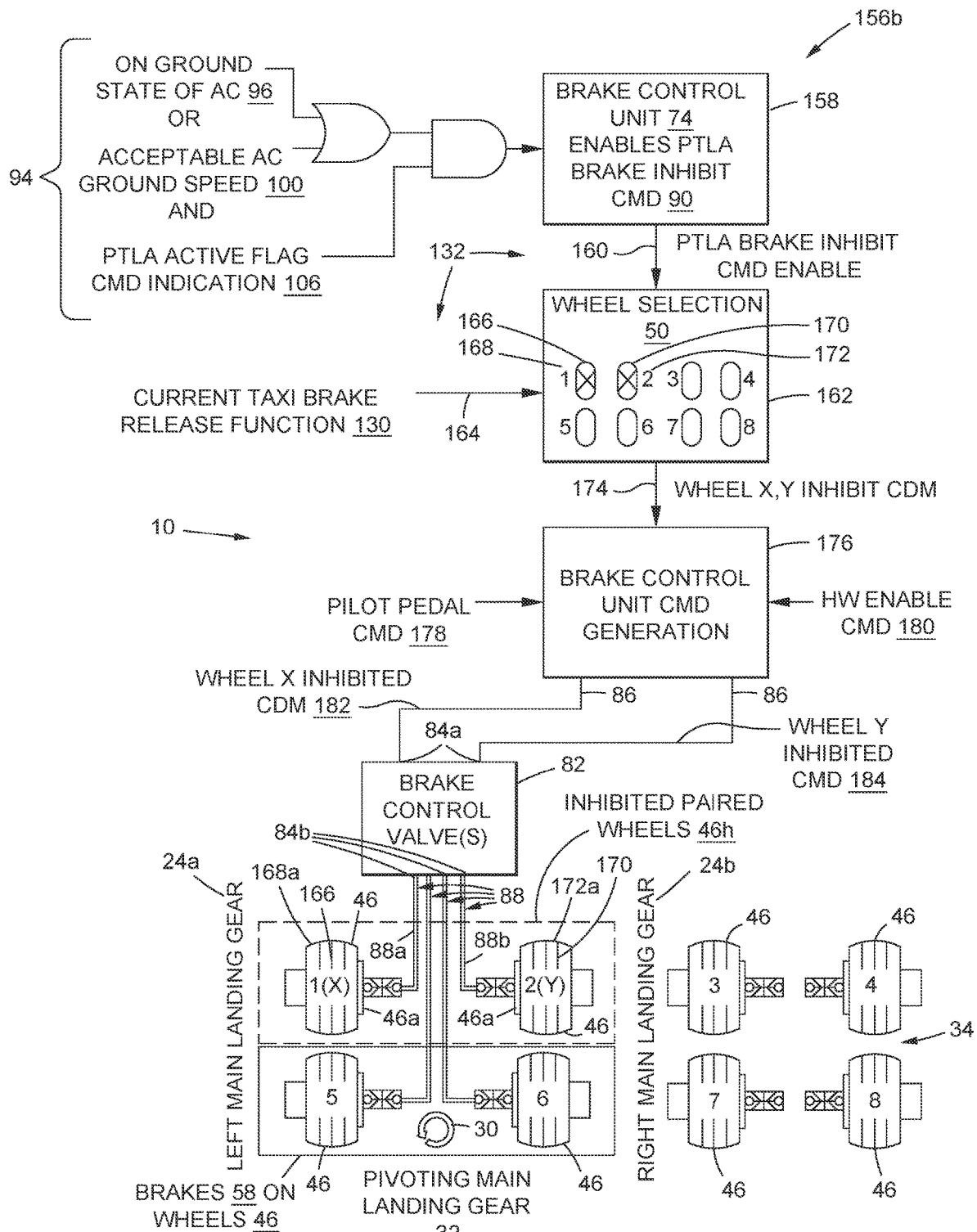
FIG. 3B is an illustration of schematic drawing of another version of a PTLA brake system command logic diagram.
Figure 3C:
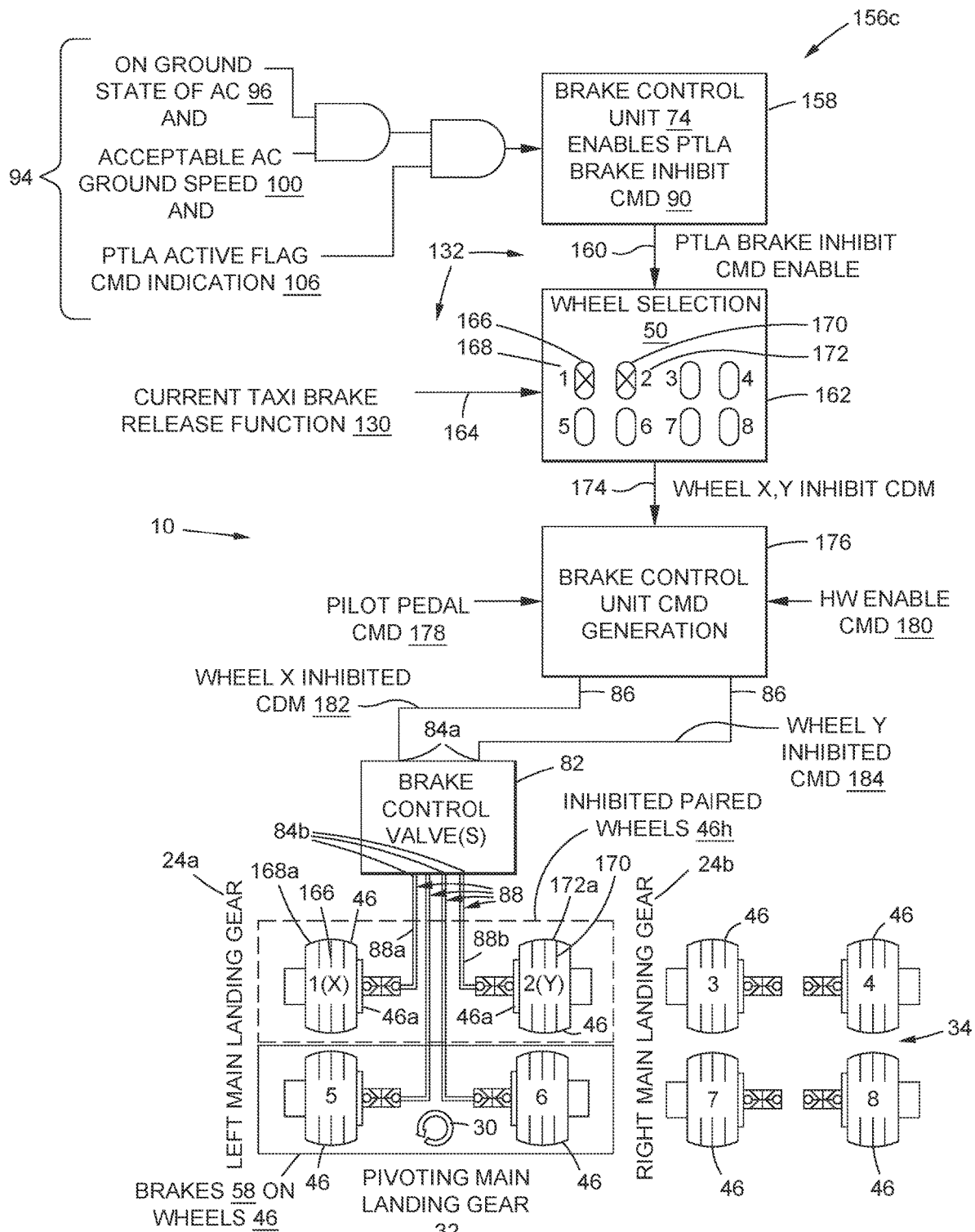
FIG. 3C is an illustration of schematic drawing of yet another version of a PTLA brake system command logic diagram.

As shown in FIGS. 1A-1B, each main landing gear 24 can include a post 42 carrying a truck 44. The truck 44 can include multiple wheels 46 (see FIGS. 1A-1B, 2A) that are selectively or collectively braked to reduce the speed of the aircraft 10 during taxi maneuvers and post-landing rollout. The aircraft 10 has at least two main landing gear 24, and each of the at least two main landing gear 24 have two or more wheels 46. For example, each main landing gear 24 may have two wheels, four wheels, six wheels, or another suitable number of wheels. Where the at least two main landing gear 24 comprise the left main landing gear 24a and the right main landing gear 24b, each of the left main landing gear 24a and the right main landing gear 24b may have two pairs 48 (see FIG. 2A) of wheels 46. Each pair 48 of wheels 46 is disposed on an axle 49 (see FIG. 2A), such as a common or single axle. As discussed in further detail below, during the pivot turn maneuver 30, one or more wheels 46, such as one or more of the two or more wheels 46, may be in the form of one or more unbraked wheels 46a (see FIG. 2A) in an unbraked state 52 (see FIG. 2A), and a remaining number 54 (see FIG. 2A) of the wheels 46, such as the two or more wheels 46, may be in the form of braked wheels 46b (see FIG. 2A) in a braked state 56 (see FIG. 2A). In one version, as shown in FIGS. 3A-3C, each main landing gear 24 comprising the left main landing gear 24a and the right main landing gear 24b, may include two forward wheels 46c and two aft wheels 46d, and further comprises two inboard wheels 46e and two outboard wheels 46f.

Each wheel 46 has one or more brakes 58 (see FIGS. 1A-1B, 2A) coupled to the wheel 46, or located at the wheel 46. As shown in FIGS. 1A-1B, the brake control system 14 is operatively coupled to the at least two main landing gear 24, and is operatively coupled to the brakes 58. The brake control system 14 is configured to control, and controls, braking of the at least two main landing gear 24. The brake control system 14 can direct the application of various combinations of brakes 58, depending upon one or more aircraft characteristics or parameters, as will be discussed in greater detail below. The brake control system 14 can also disable braking of selected brakes 58, also depending upon these characteristics or parameters.

Accordingly, the brake control system 14 can receive pilot inputs 60 (see FIGS. 1A-1B, 2A) (e.g., command signals 62 (see FIG. 2A) received via brake pedals 64 (see FIG. 2A) at a flight deck 66 (see FIG. 2A) of the aircraft 10), threshold values 68 (see FIGS. 1A-1B, 2A), and aircraft data 70 (see FIGS. 1A-1B, 2A). In particular, with versions of the PTLA brake system 12 of the disclosure, the aircraft data 70 and the threshold values 68 may be used to determine which brakes 58 to apply and which brakes 58 to inhibit, as is also described in greater detail below.

As shown in FIG. 2A, the brake control system 14 comprises a brake controller 72 with a plurality of brake control units 74. The brake control units 74 comprise electronic control units that control command signals 62 representing brake commands 76. The brake control units 74 may be implemented with the brake controller 72, such as in the form of a processor, microprocessor, or other suitable controller device. The brake control units 74 may be used with suitable hardware components, suitable software or programmable logic, memory elements, and the like, which may carry out a variety of functions under the control of the brake controller 72, or other suitable control devices. In one version, one or more of the brake control units 74 may be implemented with a computer processor that hosts software and provides external interfaces for the software.

The brake control system 14 may further comprise a plurality of controls 78 (see FIG. 2A), such as one or more of, wheel speed controls, fluid temperature controls, wheel temperature controls, valve controls, brake controls, parking brake controls, wheel power controls, anti-skid controls, taxi brake release controls, or other suitable controls. The brake control system 14 may be powered by a power supply 80 (see FIG. 2A), for example, an electrical power supply, or another suitably power supply.

As further shown in FIG. 2A, the brake control system 14 comprises a plurality of brake control valves 82. Each brake control valve 82 has a first end 84a (see FIGS. 3A-3C) and a second end 84b (see FIGS. 3A-3C). The first ends 84a of the brake control valves 82 are coupled to one or more brake control units 74, via electronic connector elements 86 (see FIGS. 3A-3C), such as wires, or other suitable connector elements. The second end 84b of each brake control valve 82 is coupled to the brake 58 or brakes 58 on each wheel 46, via a hydraulic connector element 88, such as a hydraulic line, or other suitable connector elements. One or more of the plurality of brake control units 74 generate or generates one or more brake commands 76 (see FIG. 2A) to one or more of the plurality of brake control valves 82. Those skilled in the art will appreciate that versions of the PTLA brake system 12 may be practiced using different aircraft brake control systems and aircraft configurations, and that the brake control system 14 described herein is merely one exemplary version.

As further shown in FIGS. 1A-1B and 2A, the PTLA brake system 12 comprises the PTLA brake inhibit subsystem 16 coupled to the PTLA brake system 12. The PTLA brake inhibit subsystem 16 is configured to inhibit, and inhibits, braking, and is configured to inhibit, and inhibits, the brakes 58, of one or more of the two or more wheels 46 of the one main landing gear 24 comprising the pivoting main landing gear 32, in and during the pivot turn maneuver 30 by the aircraft 10, so that at least one wheel 46 of the two or more wheels 46 is in an unbraked state 52 (see FIG. 2A), for example, a rolling state 53 (see FIG. 2A) or an inhibited state 57 (see FIG. 2A), and a remaining number 54 (see FIG. 2A) of the two or more wheels 46 are in a braked state 56 (see FIG. 2A).

The PTLA brake inhibit subsystem 16 is configured to generate, and generates, a pivot turn load alleviation (PTLA) brake inhibit command 90 (see FIG. 2A). The PTLA brake inhibit subsystem 16 inhibits braking and inhibits the brakes 58, of one or more of the two or more wheels 46 of the pivoting main landing gear 32, in and during the pivot turn maneuver 30, via activation 92 of the pivot turn load alleviation (PTLA) brake inhibit command 90, to one or more brake control units 74 of the brake control system 14, upon meeting one or more brake inhibit conditions 94.

As shown in FIG. 2A, the one or more brake inhibit conditions 94 may comprise an on ground state of the aircraft 96, indicated when the aircraft 10 is in an on ground position 98, that is, the aircraft 10 is positioned at, and moving on, a ground location rather than in the air. If the aircraft 10 is in the on ground position 98, the brake inhibit condition 94 is met or satisfied. If the aircraft 10 is in the air, the brake inhibit condition 94 is not met or satisfied. The on ground state of the aircraft 96 may be determined with the aircraft 10 being in the on ground position 98, may be determined with an aircraft on ground indication or sensor input, may be determined with a main landing gear fully extended indication or sensor input, may be determined with a tilt of the truck 44 of a main landing gear 24 indication or sensor input, may be determined with a shocks strut squat switch or oleo pressure indication or senor input, or may be determined with another suitable indication or sensor input.

As shown in FIG. 2A, the one or more brake inhibit conditions 94 may further comprise an acceptable aircraft ground speed 100, indicated when an aircraft ground speed 101 of the aircraft 10 is less than a pivot turn load alleviation (PTLA) speed threshold 104. In one exemplary version, the PTLA speed threshold 104 is 10 (ten) knots or less than 10 knots, and if the aircraft ground speed 101 is 11 (eleven)

knots, the aircraft ground speed 101 exceeds the PTLA speed threshold 104 of 10 knots, and the brake inhibit condition 94 is not met or satisfied. If the aircraft ground speed 101 is 9 (nine) knots, the aircraft ground speed 101 is less than the PTLA speed threshold 104 of 10 knots, and the brake inhibit condition 94 is met or satisfied. The acceptable aircraft ground speed 100 is preferably less than 2 (two) knots. The aircraft ground speed 101 for determining the acceptable aircraft ground speed 100 may be estimated or determined from an average wheel speed 102 (see FIG. 2A), where average wheel speed means averaging all aircraft wheel speeds, may be estimated or determined from an Inertial Reference System (IRS) ground speed or acceleration, or may be estimated or determined using another suitable system or means.

As shown in FIG. 2A, the one or more brake inhibit conditions 94 may further comprise a pivot turn load alleviation (PTLA) active flag command indication 106, generated by a monitoring logic 108 of the PTLA brake inhibit subsystem 16, to monitor brake pedal positions 110, to detect initiation 31 of the pivot turn maneuver 30, according to one of a plurality of pivot turn brake pedal profiles 112. For example, the monitoring logic 108 monitors both the left brake pedal 64a and the right brake pedal 64b to detect and to determine whether or not the pivot turn maneuver 30 is being initiated or attempted by a pilot or pilots. A monitoring logic output 108a (see FIG. 2A) is determine based on the plurality of pivot turn brake pedal profiles 112, discussed in relation to FIGS. 4-7 below. If the monitoring logic 108 of the PTLA brake inhibit subsystem 16 detects the initiation 31 of the pivot turn maneuver 30, based on one of the plurality of pivot turn brake pedal profiles 112, the brake inhibit condition 94 is met or satisfied.

In one version, the one or more of the brake inhibit conditions 94 comprises one brake inhibit condition 94 being met or satisfied, where the one brake inhibit condition 94 comprises the on ground state of the aircraft 96 or an equivalent indication or sensor input, or the acceptable aircraft ground speed 100 or an equivalent determination or estimation, or the PTLA active flag command indication 106. In another version, the brake inhibit conditions 94 may comprise two brake inhibit conditions 94 being met or satisfied, where the two brake inhibit conditions 94 comprise the combination of the on ground state of the aircraft 96 and the PTLA active flag command indication 106, or the combination of the acceptable aircraft ground speed 100 and the PTLA active flag command indication 106, or the combination of the on ground state of the aircraft 96 and the acceptable aircraft ground speed 100, or another suitable combination. In another version, the brake inhibit conditions 94 may comprise three brake inhibit conditions 94 being met or satisfied, where the three brake inhibit conditions 94 comprise the on ground state of the aircraft 96 or an equivalent indication or sensor input, and the acceptable aircraft ground speed 100 or an equivalent determination or estimation, and the PTLA active flag command indication 106.

Thus, when one or more of the brake inhibit conditions 94 are met or satisfied or detected, the PTLA brake inhibit subsystem 16 generates and activates the PTLA brake inhibit command 90 (see FIG. 2A) to the one or more brake control units 74 of the brake control system 14, and the one or more brake control units 74 enable the PTLA brake inhibit command 90 to send the PTLA brake inhibit command 90 to a wheel selection 50 (see FIG. 2A), for determining which of the two or more wheels 46 of the pivoting main landing gear 32 are to be inhibited, and to inhibit braking of the wheels 46 in the wheel selection 50. Preferably, the PTLA brake inhibit command 90 is activated very rapidly after one or more of the brake inhibit conditions 94 are met or satisfied, for example, within 100 ms (one hundred milliseconds) of the one or more brake inhibit conditions 94 being met or detected. The plurality of brake control units 74 receive the PTLA brake inhibit command 90 from the PTLA brake inhibit subsystem 16 and inhibit generation of at least one brake command 76 (see FIG. 2A) corresponding to at least one of the plurality of brake control valves 82 coupled to the at least one wheel 46 that is in the unbraked state 52. Preferably, the selection of one or more wheels 46 (see FIG. 2A) to be inhibited changes to the next wheel 46, in sequence, whenever either left or right commanded brake pedal effort transitions from above 12% (twelve percent) to 8% (eight percent) of full brake pedal travel.

In one version, the wheel selection 50 may comprise one axle pair 48a of wheels 46 on the pivoting main landing gear 32, for example, one axle pair 48a of forward wheels 46c (see FIGS. 3A-3C) or one axle pair 48a of aft wheels 46d (see FIGS. 3A-3C), on either the left main landing gear 24a, when the left main landing gear 24a is the pivoting main landing gear 32, or the right main landing gear 24b, when the right main landing gear 24b is the pivoting main landing gear 32. With this version, one axle pair 48a of wheels 46 shall be inhibited at a time.

Preferably, the wheel selection 50 comprises a pair 48 of wheels 46, either forward wheels 46c (see FIGS. 3A-3C) or aft wheels 46d (see FIGS. 3A-3C) that share an axle 49 (see FIG. 2A), on a four wheel 46, two axle 49, pivoting main landing gear 32, and that are in an unbraked state 52 (see FIG. 2A) during the pivot turn maneuver 30, and the other pair 48 of wheels 46 of the four wheel 46, two axle 49, pivoting main landing gear 32 are in a braked state 56 (see FIG. 2A) during the pivot turn maneuver 30. With this version, for each subsequent pivot turn maneuver 30a (see FIG. 2A), the wheel selection 50 of the one axle pair 48a of wheels 46 changes, in a sequential order 51 (see FIG. 2A), to a different axle pair 48b (see FIG. 2A) of wheels 46, such as another axle pair 48a of wheels 46. Preferably, the selection of inhibited axle pairs 48c (see FIG. 2A) changes to the next axle pair 48a of wheels 46, in sequence, whenever either left or right commanded brake pedal effort transitions from above 12% (twelve percent) to 8% (eight percent) of full brake pedal travel. This percentage value corresponds to a normalized full brake pedal travel, for example, 0% is fully off the brake pedal, and 100% is the brake pedal fully depressed.

In another version, where the pivoting main landing gear 32 has four wheels 46, the PTLA brake inhibit command 90 of the PTLA brake inhibit subsystem 16 may inhibit braking of one wheel 46, that is, one wheel 46 in the unbraked state 52 and three wheels 46 in the braked state 56 on the pivoting main landing gear 32, in and during the pivot turn maneuver 30 by the aircraft 10. In yet another version, where the pivoting main landing gear 32 has four wheels 46, the PTLA brake inhibit command 90 of the PTLA brake inhibit subsystem 16 may inhibit braking of three wheels 46, that is, three wheels 46 in the unbraked state 52 and one wheel 46 in the braked state 56 on the pivoting main landing gear 32, in and during the pivot turn maneuver 30 by the aircraft 10. In yet another version, where the pivoting main landing gear 32 has four wheels 46, the PTLA brake inhibit command 90 of the PTLA brake inhibit subsystem 16 may inhibit braking of two wheels 46 that are not axle pair 48a wheels 46, for example, one forward wheel 46c and one aft wheel 46d, either inboard wheels 46e (see FIG. 2A) or outboard wheels 46f (see FIG. 2A), or two diagonal wheels 46i (see FIG. 2A) such as two opposite corner wheels, in and during the pivot turn maneuver 30 by the aircraft 10.

For the axle pair 48a combination of wheels 46 of two diagonal wheels 46i, such as two opposite corner wheels, where one pair of two diagonal wheels 46i are in the braked state 56 and the other pair of two diagonal wheels 46i are in the rolling state 53 (see FIG. 2A), the estimated reduction in torsional load reaction 28b, or torque load, is about 9%. For the axle pair 48a combination of wheels 46 with one forward wheel 46c (see FIG. 2) and one aft wheel 46d (see FIG. 2) in the braked state 56, and the other forward wheel 46c and the other aft wheel 46d in the rolling state 53, the estimated reduction in torsional load reaction 28b, or torque load, is about 18%. For the axle pair 48a combination of wheels 46 with two forward wheels 46c (see FIG. 2) in the braked state 56 and the other two aft wheels 46d (see FIG. 2) in the rolling state 53, the estimated reduction in torsional load reaction 28b, or torque load, is about 13%. This alternate wheel pairing enables integration with the taxi brake release function 130 (see FIG. 2A).

The PTLA brake inhibit command 90 acts as a pivot turn assist function 114 (see FIG. 2A), and may be implemented in one brake control unit 74 (see FIG. 2A) or more than one the brake control units 74.

Further, the PTLA brake inhibit subsystem 16 may be configured such that no single loss of function results in an erroneous brake inhibit on both trucks 44, that is, the left truck and the right truck. Moreover, no single loss of function, except power loss to the brake control units 74 of the brake control system 14, shall result in loss of function on one main landing gear 24.

As shown in FIG. 2A, the PTLA brake inhibit command 90 may undergo deactivation 116 and be removed, when one or more brake inhibit deactivation conditions 118 is/are met or satisfied. As shown in FIG. 2A, the one or more brake inhibit deactivation conditions 118 may comprise the aircraft ground speed 101 of the aircraft 10 exceeds the pivot turn load alleviation (PTLA) speed threshold 104, for example, the aircraft ground speed 101 exceeds, or is greater than, 10 (ten) knots. As shown in FIG. 2A, the one or more brake inhibit deactivation conditions 118 may further comprise both brake pedal commands 120, including a left brake pedal command 120a and a right brake pedal command 120b, exceed a pivot turn load alleviation (PTLA) triggering brake pedal command threshold 122, for at least a predetermined time period 124. In one version, the predetermined time period 124 may be one (1) second after both the left brake pedal command 120a and the right brake pedal command 120b exceed the PTLA triggering brake pedal command threshold 122, for example, above a 50% command threshold. The predetermined time period 124, such as the one (1) second delay, is to ensure both brake pedal commands 120 (see FIG. 2A) are consistently above the PTLA triggering brake pedal command threshold 122, for example, above the 50% command threshold, indicating that the pilot 154 (see FIG. 2B) is requiring the need to stop the aircraft 10 rapidly or come to a complete stop. Once the predetermined time period 124, such as the one (1) second timer, is up and both brake pedal commands 120 are above or exceed the PTLA triggering brake pedal command threshold 122, for example, above the 50% command threshold, then the remaining two brakes 58 which were inhibited will return to the commanded braking level.

As shown in FIG. 2A, the one or more brake inhibit deactivation conditions 118 may further comprise the aircraft 10 entering into an active parking brake state 126, that is, a parking brake 128 of the aircraft 10 is engaged, or becomes active.

In one version, the one or more of the brake inhibit deactivation conditions 118 comprises one brake inhibit deactivation condition 118 being met or satisfied, where the one brake inhibit deactivation condition 118 comprises the aircraft ground speed 101 of the aircraft 10 exceeds the pivot turn load alleviation (PTLA) speed threshold 104, or both brake pedal commands 120, including the left brake pedal command 120a and the right brake pedal command 120b, exceed the PTLA triggering brake pedal command threshold 122, for at least the predetermined time period 124, or the aircraft 10 enters into the active parking brake state 126. In another version, the brake inhibit deactivation conditions 118 may comprise two brake inhibit deactivation conditions 118 being met or satisfied, where the two brake inhibit deactivation conditions 118 comprise the combination of the aircraft ground speed 101 of the aircraft 10 exceeds the pivot turn load alleviation (PTLA) speed threshold 104, and both brake pedal commands 120, including the left brake pedal command 120a and the right brake pedal command 120b, exceed the PTLA triggering brake pedal command threshold 122, for at least the predetermined time period 124; or the combination of the aircraft 10 exceeds the PTLA speed threshold 104, and the aircraft 10 enters into the active parking brake state 126; or the combination of both brake pedal commands 120, including the left brake pedal command 120a and the right brake pedal command 120b, exceed the PTLA triggering brake pedal command threshold 122, for at least the predetermined time period 124, and the aircraft 10 enters into the active parking brake state 126. In another version, the brake inhibit deactivation conditions 118 may comprise three brake inhibit deactivation conditions 118 being met or satisfied, where the three brake inhibit deactivation conditions 118 comprise the aircraft ground speed 101 of the aircraft 10 exceeds the pivot turn load alleviation (PTLA) speed threshold 104, and both brake pedal commands 120, including the left brake pedal command 120a and the right brake pedal command 120b, exceed the PTLA triggering brake pedal command threshold 122, for at least the predetermined time period 124, and the aircraft 10 enters into the active parking brake state 126.

As further shown in FIG. 2A, the aircraft 10 may optionally include a taxi brake release function 130. In the case where the aircraft 10 already includes the taxi brake release function 130, the PTLA brake inhibit subsystem 16 may be integrated with the taxi brake release function 130, to obtain a taxi brake release function integration 132. The taxi brake release function 130 may limit the brakes 58 to one or more but not all of the wheels 46. In one example, the taxi brake release function 130 may limit the brakes 58 to a pair 48 (see FIG. 2A) of wheels 46. The taxi brake release function 130 selects a wheel selection 50 (see FIGS. 3A-3C) for the PTLA brake inhibit command 90 (see FIGS. 2A, 3A-3C), to inhibit braking of one or more but not all of the wheels 46 of the pivoting main landing gear 32. In one example, one or more but not all of the wheels 46, such as a wheel pairing, as shown in the left main landing gear 24a in FIGS. 3A-3C, and discussed in further detail below, may be selected, as it optionally enables integration of an existing taxi brake release function 130, also referred to as a taxi brake select function, and the PTLA brake inhibit command 90 function under the same PTLA brake inhibit subsystem 16 algorithm or programmed logic.

The PTLA brake system 12 alleviates loads 28 (see FIG. 2A), such as structural loads 28a (see FIG. 2A), on the pivoting main landing gear 32 during the pivot turn maneuver 30 by the aircraft 10, and reduces wear 136 (see FIG. 2A) on the at least one wheel 46 that is in the unbraked state 52, that is, the at least one unbraked wheel 46a (see FIG. 2A) with inhibited brakes, and reduces wear 136 on the tire of the wheel 46. Further, the PTLA brake system 12 inhibits braking on one or more brakes 58 on the pivoting main landing gear 32, in order to reduce torsional load reaction 28b (see FIG. 2A) exerted on the pivoting main landing gear 32. The PTLA brake system 12 may also reduce cornering forces 134 (see FIG. 2A), which, in turn, also reduce wear 136. The PTLA brake system 12 may also provide U-turn optimization 138 (see FIG. 2A), when the inboard wheels 46e are released. The PTLA brake system 12 may also reduce the overall weight of the main landing gear 24, because with reduced structural loads 28a and reduced cornering forces 134, various components and materials on the main landing gear 24 may be reduced or eliminated, for example, a smaller, reduced weight scissor link, a smaller, reduced weight torque link, or another downsized structure on the main landing gear 24, such as the pivoting main landing gear 32. The potential to reduce weight of the main landing gear 24 of the aircraft 10 may be at least a weight savings of twenty-five pounds (25 lbs.) or more.

Figure 2B:
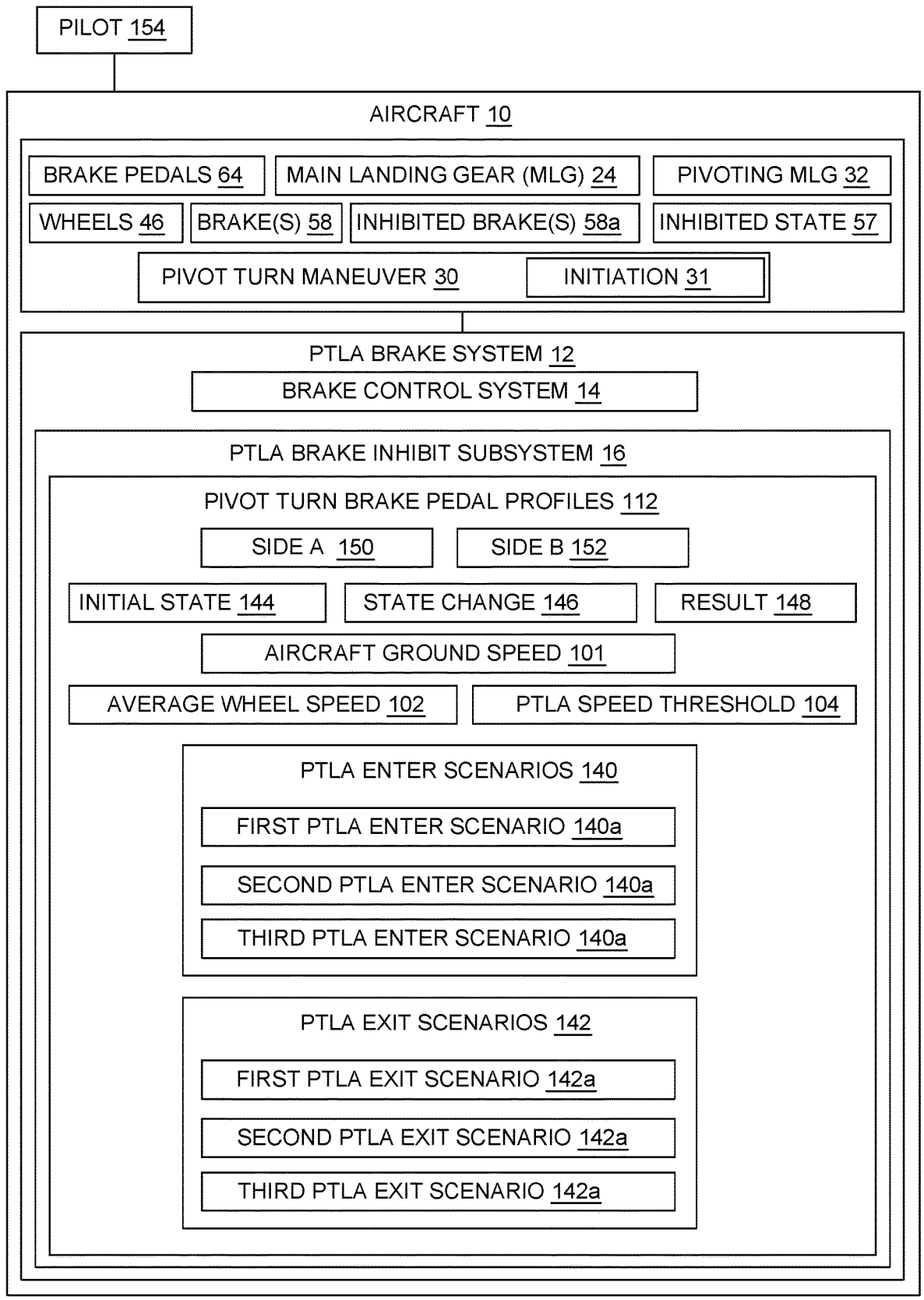
FIG. 2B is an illustration of a functional block diagram showing aircraft and the PTLA brake inhibit subsystem of FIG. 2A with PTLA enter scenarios and PTLA exit scenarios.

Now referring to FIG. 2B, FIG. 2B is an illustration of a functional block diagram showing the aircraft 10 and the PTLA brake inhibit subsystem 16 of FIG. 2A with a plurality of PTLA enter scenarios 140 and a plurality of PTLA exit scenarios 142. As further shown in FIG. 2B, the PTLA brake system 12 includes the brake control system 14 and the PTLA brake inhibit subsystem 16 that monitors the PTLA enter scenarios 140 and PTLA exit scenarios 142. The various pivot turn brake pedal profiles 112 (see FIG. 2B) monitored and sensed by the monitoring logic 108 (see FIG. 2A) to detect and determine the initiation 31 (see FIG. 2A) of the pivot turn maneuver 30 (see FIG. 2B), as shown in FIGS. 4-7, and discussed in further detail below, each represent one of the PTLA enter scenarios 140 and one of the PTLA exit scenarios 142. Each of the PTLA enter scenarios 140 and each of the PTLA exit scenarios 142 include an initial state 144 (see FIG. 2B), a state change 146 (see FIG. 2B), and a result 148 (see FIG. 2B).

Three (3) exemplary PTLA enter scenarios 140 are described below using a Side A 150 (see FIG. 2B) and a Side B 152 (see FIG. 2B) of one main landing gear 24 (see FIG. 2B) entering into a pivot turn maneuver 30 (see FIG. 2B) or pivot turn, to become a pivoting main landing gear 32 (see FIG. 2B), with brake pedals 64 (see FIG. 2B) to the one main landing gear 24, and four wheels 46 (see FIG. 2B) with brakes 58 (see FIG. 2B) of the one main landing gear 24. The three (3) exemplary PTLA enter scenarios 140 are summarized as follows:

(1) A first PTLA enter scenario 140a (see FIG. 2B) includes: (a) an initial state 144 of no brakes 58 are on/applied on Side A and no brakes 58 are on/applied on Side B, with the aircraft ground speed 101 (see FIG. 2B), for example, as determined with the average wheel speed 102 (see FIG. 2B), below the PTLA speed threshold 104 (see FIG. 2B); (b) a state change 146 of a pilot 154 (see FIG. 2B) applying the brake pedal 64 on Side A, and the brake pedal 64 on Side B is not applied, with the aircraft ground speed 101 (see FIG. 2B), for example, as determined with the average wheel speed 102, below the PTLA speed threshold 104; and (c) a result 148 with one or more brakes 58 on Side A are on/applied and one or more brakes 58 on Side B are inhibited brakes 58a (see FIG. 2B) in an inhibited state 57 (see FIG. 2B), and no brakes 58 on Side B are on/applied, and with the aircraft ground speed 101 (see FIG. 2B), for example, as determined with the average wheel speed 102, below the PTLA speed threshold 104.

(2) A second PTLA enter scenario 140b (see FIG. 2B) includes: (a) an initial state 144 of brakes 58 are on/applied on Side A and brakes 58 are on/applied on Side B, with the aircraft ground speed 101 (see FIG. 2B), for example, as determined with the average wheel speed 102, below the PTLA speed threshold 104; (b) a state change 146 of the pilot releasing the brake pedal 64 on Side B, and the brake pedal 64 on Side B is still on/applied and held down, with the aircraft ground speed 101 (see FIG. 2B), for example, as determined with the average wheel speed 102, below the PTLA speed threshold 104; and (c) a result 148 of one or more brakes 58 on Side A are still on/applied, and all brakes 58 on Side B and one or more brakes 58 on Side A are released, so that the one or more brakes 58 on Side A that are released are inhibited brakes 58a in an inhibited state 57, and with the aircraft ground speed 101 (see FIG. 2B), for example, as determined with the average wheel speed 102, below the PTLA speed threshold 104.

(3) A third PTLA enter scenario 140c (see FIG. 2B) includes: (a) an initial state 144 of brakes 58 are on/applied on Side A and no brakes 58 are on/applied on Side B, with the aircraft ground speed 101 (see FIG. 2B), for example, as determined with the average wheel speed 102, above the PTLA speed threshold 104; (b) a state change 146 of the aircraft 10 decelerating so that the aircraft ground speed 101 (see FIG. 2B), for example, as determined with the average wheel speed 102, is below the PTLA speed threshold 104, and the brake pedal 64 on Side B is still on/applied and held down, and the brake pedal 64 on Side B is not applied; and (c) a result 148 of no brakes 58 on Side B are on/applied, and one or more brakes 58 on Side A are released, so that the one or more brakes 58 on Side A that are released are inhibited brakes 58a in an inhibited state 57, and with the aircraft ground speed 101 (see FIG. 2B), for example, as determined with the average wheel speed 102 below the PTLA speed threshold 104.

Three (3) exemplary PTLA exit scenarios 142 (see FIG. 2B) are described below using the Side A 150 and the Side B 152 of one main landing gear 24 entering into the pivot turn maneuver 30 or pivot turn, to become a pivoting main landing gear 32 (see FIG. 2B), with brake pedals 64 to the one main landing gear 24, and two or more wheels 46, for example, four wheels 46, with brakes 58 of the one main landing gear 24. The three (3) exemplary PTLA exit scenarios 142 are summarized as follows:

(1) A first PTLA exit scenario 142a (see FIG. 2B) includes: (a) an initial state 144 of one or more brakes 58 on Side A are on/applied and are inhibited brakes 58a in an inhibited state 57, and no brakes 58 are on/applied on Side B, with the aircraft ground speed 101 (see FIG. 2B), for example, as determined with the average wheel speed 102, below the PTLA speed threshold 104; (b) a state change 146 of a pilot releasing the brake pedal 64 on Side A, and the brake pedal 64 on Side B is not applied, with the aircraft ground speed 101 (see FIG. 2B), for example, as determined with the average wheel speed 102, below the PTLA speed threshold 104; and (c) a result 148 with no brakes 58 on/applied on Side A and no brakes 58 on/applied on Side B, and with the aircraft ground speed 101 (see FIG. 2B), for example, as determined with the average wheel speed 102, below the PTLA speed threshold 104.

(2) A second PTLA exit scenario 142b (see FIG. 2B) includes: (a) an initial state 144 of one or more brakes 58 on Side A are on/applied, and are inhibited brakes 58a in an inhibited state 57, and no brakes 58 are on/applied on Side B, with the aircraft ground speed 101 (see FIG. 2B), for example, as determined with the average wheel speed 102, below the PTLA speed threshold 104; (b) a state change 146 of a pilot applying the brake pedal 64 on Side B, and the brake pedal 64 on Side A is held down, with the aircraft ground speed 101 (see FIG. 2B), for example, as determined with the average wheel speed 102, below the PTLA speed threshold 104; and (c) a result 148 with all (full) brakes 58 on/applied on Side A and all (full) brakes 58 on/applied on Side B, and with the aircraft ground speed 101 (see FIG. 2B), for example, as determined with the average wheel speed 102, below the PTLA speed threshold 104.

(3) A third PTLA exit scenario 142c (see FIG. 2B) includes: (a) an initial state 144 of one or more brakes 58 on Side A are on/applied and are inhibited brakes 58a in an inhibited state 57, and no brakes 58 are on/applied on Side B, with the aircraft ground speed 101 (see FIG. 2B), for example, as determined with the average wheel speed 102, below the PTLA speed threshold 104; (b) a state change 146 of the aircraft 10 accelerating so that the aircraft ground speed 101 (see FIG. 2B), for example, as determined with the average wheel speed 102, is above the PTLA speed threshold 104, and the brake pedal 64 on Side B is still on/applied and held down, and the brake pedal 64 on Side B is not applied; and (c) a result 148 with all (full) brakes 58 on/applied on Side A, and no brakes 58 on/applied on Side B, and with the aircraft ground speed 101 (see FIG. 2B), for example, as determined with the average wheel speed 102, above the PTLA speed threshold 104.

With the above discussed plurality of PTLA enter scenarios 140 and plurality of PTLA exit scenarios 142, the brakes 46 may be limited to one or more but not all of the brakes 46 based on the taxi brake release function 130 (see FIG. 2A), and the no brakes applied may mean brakes below a certain pedal threshold, such as a minimum PTLA triggering brake pedal command threshold 122a (see FIG. 4), for example, 25% pilot brake pedal effort (see FIGS. 4-7). In addition, with the above discussed plurality of PTLA enter scenarios 140 and plurality of PTLA exit scenarios 142, the apply or applied pedal may mean the brake 58 passes above a certain pedal threshold, such as a maximum PTLA triggering brake pedal command threshold 122b (see FIG. 4), for example, 27% pilot brake pedal effort (see FIGS. 4-7), and the release pedal may mean the brake 58 passes below the minimum PTLA triggering brake pedal command threshold 122a (see FIG. 4), for example, 25% pilot brake pedal effort (see FIGS. 4-7). In addition, differential wheel speeds between the left main landing gear 24a and the right main landing gear 24b may be considered to obtain a more precise activation criteria. Moreover, a secondary threshold may be used to ensure the pivot turn command was intended or not intended, and a delay function may be used to ensure the brake pedal command 120 was intended to execute the scheme, i.e. a pivoted turn. The percentage values correspond to a normalized full brake pedal travel, for example, 0% is fully off the brake pedal, and 100% is the brake pedal fully depressed.

As shown in FIGS. 1A-1B and 2A, in another version of the disclosure, there is provided the aircraft 10 comprising the fuselage 18 (see FIGS. 1A-1B), and one or more wings 20 (see FIGS. 1A-1B) attached to the fuselage 18, and a plurality of landing gear 22 (see FIGS. 1A-1B) attached to the fuselage 18. The plurality of landing gear 22 comprising the nose landing gear 26 (see FIGS. 1A-1B), and at least two main landing gear 24 (see FIGS. 1A-1B, 2A), each of the at least two main landing gear 24 having two or more wheels 46 (see FIGS. 1A-1B, 2A), wherein during a pivot turn maneuver 30 (see FIG. 2A) by the aircraft 10, one of the at least two main landing gear 24 comprises a pivoting main landing gear 32 (see FIG. 2A). Each main landing gear 24 may have, for example, two wheels, four wheels, six wheels, or another suitable number of wheels.

The aircraft 10 further comprises the PTLA brake system 12 comprising the brake control system 14 operatively coupled to the at least two main landing gear 24, wherein the brake control system 14 controls braking of the at least two main landing gear 24. The PTLA system further comprises the PTLA brake inhibit subsystem 16 coupled to the brake control system 14, wherein the PTLA brake inhibit subsystem 16 inhibits braking of one or more of the two or more wheels 46 of one main landing gear 24 comprising the pivoting main landing gear 32, during the pivot turn maneuver 30, so that at least one wheel 46 of the two or more wheels 46 is in the unbraked state 52, and a remaining number 54 of the two or more wheels 46 are in the braked state 56. As discussed above, the PTLA brake system 12 alleviates the structural loads 28a on the pivoting main landing gear 32, during the pivot turn maneuver 30 by the aircraft 10, and reduces wear 136 on the at least one wheel 46 that is in the unbraked state 52.

The PTLA brake inhibit subsystem 16 inhibits braking, via activation 92 (see FIG. 2A) of the PTLA brake inhibit command 90, to one or more brake control units 74 (see FIG. 2A) of the brake control system 14, upon detection of one or more of the brake inhibit conditions 94 (see FIG. 2A). As discussed above, the one or more brake inhibit conditions 94 comprises one or more of, (a) the on ground state of the aircraft 96 (see FIG. 2A), indicated when the aircraft 10 is in the on ground position 98 (see FIG. 2A; (b) an acceptable aircraft ground speed 100 (see FIG. 2A), indicated when an aircraft ground speed 101 (see FIG. 2A) of the aircraft 10 is less than the PTLA speed threshold 104 (see FIG. 2A); or (c) the PTLA active flag command indication 106 (see FIG. 2A), generated by the monitoring logic 108 (see FIG. 2A) of the PTLA brake inhibit subsystem 16, to monitor brake pedal positions 110 (see FIG. 2A), to detect initiation 31 of the pivot turn maneuver 30, according to one of the plurality of pivot turn brake pedal profiles 112 (see FIG. 2A).

The PTLA brake inhibit command 90 is deactivated when one or more of the brake inhibit deactivation conditions 118 (see FIG. 2A) is/are met or satisfied. The brake inhibit deactivation conditions 118 may comprise one or more of: (a) the aircraft ground speed 101 of the aircraft 10 exceeds the PTLA speed threshold 104; (b) both the left brake pedal command 120a (see FIG. 2A) and the right brake pedal command 120b (see FIG. 2A) exceed the PTLA triggering brake pedal command threshold 122 (see FIG. 2A), for at least a predetermined time period 124 (see FIG. 2A); or (c) the aircraft 10 enters into the active parking brake state 126 (see FIG. 2A).

In one version, the aircraft 10 may further comprise the taxi brake release function 130, and the PTLA brake inhibit subsystem 16 is integrated with the taxi brake release function 130, which executes the PTLA brake inhibit command 90 on behalf of the PTLA brake inhibit subsystem 16, to inhibit braking of one or more but not all of the wheels 46 of the pivoting main landing gear 32.

Now referring to FIGS. 3A-3C, FIG. 3A is an illustration of schematic drawing of a PTLA brake system command logic diagram 156a in a pivot turn maneuver 30 by the aircraft 10, FIG. 3B is an illustration of schematic drawing of another version of a PTLA brake system command logic diagram 156b, and FIG. 3C is an illustration of schematic drawing of yet another version of a PTLA brake system command logic diagram 156c.

FIG. 3A shows the PTLA brake system command logic diagram 156a where the brake inhibit condition 94 comprises one brake inhibit condition 94 comprising the PTLA active flag command (CMD) indication 106 activating the PTLA brake inhibit command 90, to result in a PTLA brake inhibit command (CMD) enable function 158, where a brake control unit 74 of the brake control system 14 (see FIG. 2A) enables the PTLA brake inhibit command 90. The PTLA active flag command indication 106 is generated by the monitoring logic 108 (see FIG. 2A), which determines whether or not the pivot turn maneuver 30 is being attempted by the pilot 154 (see FIG. 2B), and the monitoring logic output 108a (see FIG. 2A) is determined based on one of the pivot turn brake pedal profiles 112 (see FIGS. 2A-2B, 4-7).

FIG. 3B shows the PTLA brake system command logic diagram 156b where the brake inhibit conditions 94 comprise two brake inhibit conditions 94 comprising either, (a) the on ground state of the aircraft 96 and the PTLA active flag command (CMD) indication 106, or (b) the acceptable aircraft ground speed 100 and the PTLA active flag command (CMD) indication 106, where either combination activates the PTLA brake inhibit command 90. This results in the PTLA brake inhibit command (CMD) enable function 158, where the brake control unit 74 of the brake control system 14 (see FIG. 2A) enables the PTLA brake inhibit command 90. The PTLA active flag command indication 106 is generated by the monitoring logic 108 (see FIG. 2A), which determines whether or not the pivot turn maneuver 30 is being attempted by the pilot 154 (see FIG. 2B), and the monitoring logic output 108a (see FIG. 2A) is determined based on one of the pivot turn brake pedal profiles 112 (see FIGS. 2A-2B, 4-7).

FIG. 3C shows the PTLA brake system command logic diagram 156b where the brake inhibit conditions 94 comprise all of, (a) the on ground state of the aircraft 96, (b) the acceptable aircraft ground speed 100, and (c) the PTLA active flag command (CMD) indication 106, to activate or generate the PTLA brake inhibit command 90. This results in the PTLA brake inhibit command (CMD) enable function 158, where the brake control unit 74 of the brake control system 14 (see FIG. 2A) enables the PTLA brake inhibit command 90. The PTLA active flag command indication 106 is generated by the monitoring logic 108 (see FIG. 2A), which determines whether or not the pivot turn maneuver 30 is being attempted by the pilot 154 (see FIG. 2B), and the monitoring logic output 108a (see FIG. 2A) is determined based on one of the pivot turn brake pedal profiles 112 (see FIGS. 2A-2B, 4-7).

As shown in FIGS. 3A-3C, the PTLA brake inhibit command (CMD) enable function 158 is carried out where the brake control unit 74 of the brake control system 14 (see FIG. 2A) enables the PTLA brake inhibit command 90, to result in a PTLA brake inhibit command (CMD) enable 160 sent to a wheel selection function 162. As further shown in FIGS. 3A-3C, the PTLA brake inhibit command 90 may optionally be integrated with the taxi brake release function 130 if it is present and existing on the aircraft 10 (see FIGS. 1A-1B, 2A), to obtain the taxi brake release function integration 132. As shown in FIGS. 3A-3C, a current taxi brake release selection 164 may optionally be selected, when it already exists and is present on the aircraft 10, to select Wheel X 166 in a number 1 position 168 corresponding to a forward outboard wheel position number 1 168a of the wheels 46 of the left main landing gear 24a which, in this case, is the pivoting main landing gear 32. As shown in FIGS. 3A-3C, the current taxi brake release selection 164 further selects Wheel Y 170 in a number 2 position 172 corresponding to a forward outboard wheel position number 2 172a of the wheels 46 of the left main landing gear 24a. FIGS. 3A-3C shows the left main landing gear 24a with four wheels 46 and the right main landing gear 24b with four wheels 46. Wheel X 166 and Wheel Y 170 are an axle pair 48a (see FIGS. 3A_3C) of wheels 46. The PTLA brake inhibit command 90 inhibits the braking of Wheel X 166 and Wheel Y 170, and a Wheel X, Y inhibit command (CMD) 174 (see FIGS. 3A_3C) is sent to a brake control unit command (CMD) generation 176. As shown in FIGS. 3A-3C, the brake control unit command generation 176 also receives a pilot pedal command (CMD) 178 and a hardware (HW) enable command (CMD) 180.

As shown in FIGS. 3A-3C, the brake control unit command generation 176 then sends a Wheel X inhibited command (CMD) 182 and a Wheel Y inhibited command (CMD) 184 to the brake control valves 82. One brake control valve 82 is coupled, or connected to, Wheel X 166, via a first hydraulic connector element 88a, to inhibit braking of Wheel X 166 on the left main landing gear 24a, and another brake control valve 82 is coupled or connected to Wheel Y 170, via a second hydraulic connector element 88b, to inhibit braking of Wheel Y 170 on the left main landing gear 24a. As shown in FIGS. 3A-3C, the PTLA brake inhibit command 90, along with the brake control units 74 and the brake control valves 82, result in inhibited paired wheels 46h on the pivoting main landing gear 32. As shown in FIGS. 3A-3C, no wheels on the right main landing gear 24b, which is a non-pivoting main landing gear 34, are inhibited.

Figure 4:
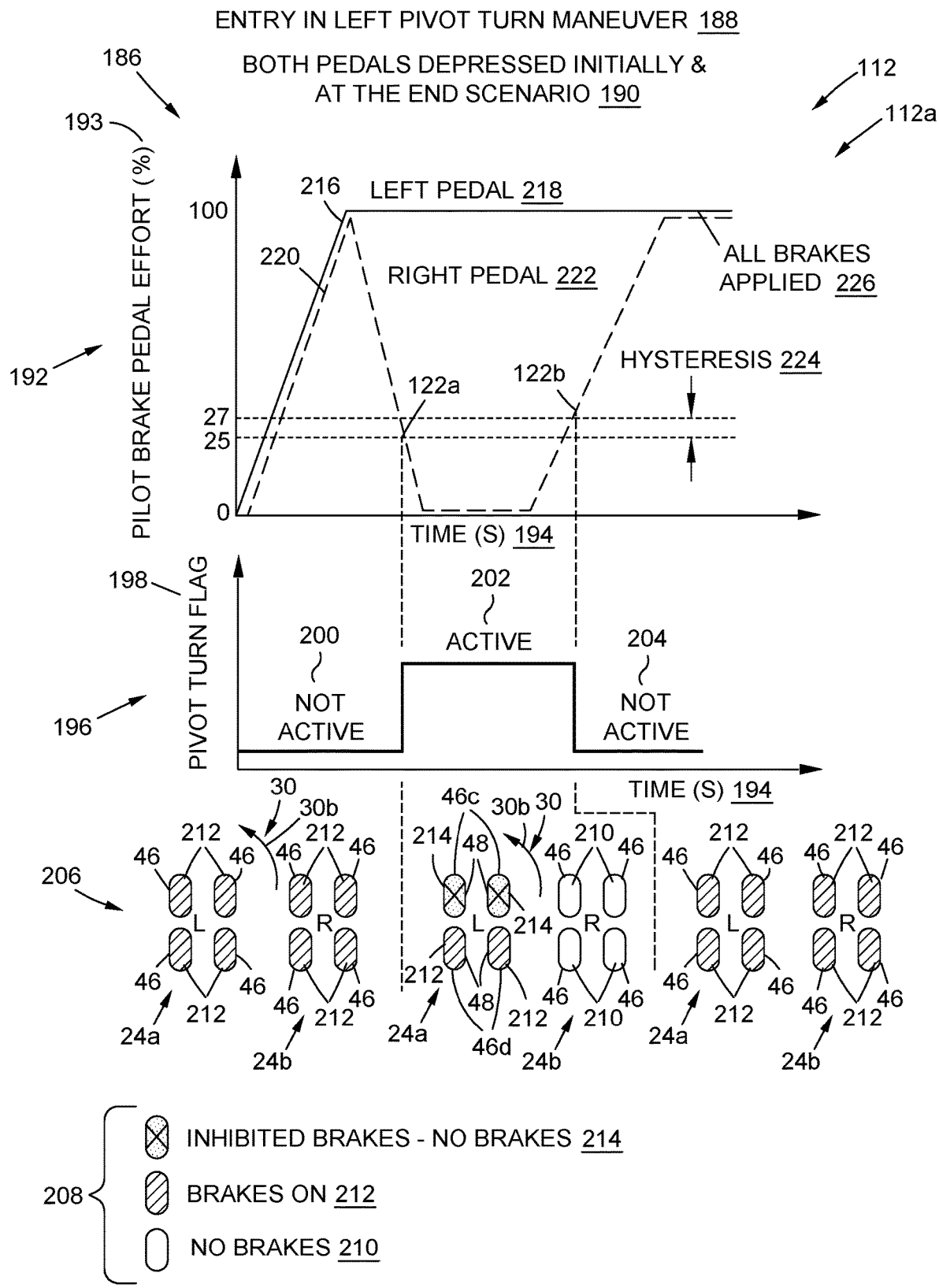
FIG. 4 is an illustration of a graph showing a first pivot turn brake pedal profile.

Now referring to FIG. 4, FIG. 4 is an illustration of a graph 186 showing a pivot turn brake pedal profile 112, in the form of an exemplary first pivot turn brake pedal profile 112a, where entry is made into a pivot turn maneuver 30, in the form of a left pivot turn maneuver 30b, for an entry in left pivot turn maneuver 188 with a both pedals depressed initially and at the end scenario 190. As shown in FIG. 4, the graph 186 includes a first portion 192 with a pilot brake pedal effort 193 in percent (%) on the y-axis, and time 194 in seconds (s) on the x-axis. This percentage value corresponds to a normalized full brake pedal travel, for example, 0% is fully off the brake pedal, and 100% is the brake pedal fully depressed. As further shown in FIG. 4, the graph 186 includes a second portion 196 with a pivot turn flag 198 on the y-axis and also time 194 in seconds (s) on the x-axis, and a first not active portion 200, an active portion 202, and a second not active portion 204 along the x-axis. As further shown in FIG. 4, the graph 186 includes a third portion 206 showing brake states 208 of wheels 46 on the left main landing gear 24a and the right main landing gear 24b. As further shown in FIG. 4, the brake states 208 include no brakes 210, brakes on 212, and inhibited brakes-no brakes 214.

As shown in FIG. 4, the first portion 192 shows a left pedal plot 216 for a left pedal 218 and shows a right pedal plot 220 for a right pedal 222, through the first not active portion 200, the active portion 202, and the second not active portion 204, as the entry in left pivot turn maneuver 188 transitions into and out of a braked pivot turn. The first portion 192 further shows hysteresis 224 with a minimum PTLA triggering brake pedal command threshold 122a and a maximum PTLA triggering brake pedal command threshold 122b. As used herein, "hysteresis" refers to an output selection in which an output command changes at different thresholds depending on the direction of an input command travel. Such hysteresis is used in control functions to avoid limit cycling effect in the output command, if the input, for example, the brake pedal command, signal oscillates from one fixed threshold to another.

As shown in FIG. 4, during the first not active portion 200, the left pedal 218 and the right pedal 220 are both initially depressed and the wheels 46 of the left main landing gear 24a and the right main landing gear 24b are in the brakes on 212 brake state 208. As further shown in FIG. 4, during the active portion 202, the left pedal 218 is held down, and the right pedal 222 is released and the wheels 46 of the right main landing gear 24b are in the no brakes 210 brake state 208. As shown in FIG. 4, when the right pedal plot 220 falls below the minimum PTLA triggering brake pedal command threshold 122a transitioning from the first not active portion 200 to the active portion 202 (and the average wheel speed 102 (see FIG. 2A) is less than the PTLA speed threshold 104 (see FIG. 2A)), the PTLA brake inhibit command 90 is activated and PTLA is entered, and the PTLA brake inhibit command 90 (see FIGS. 2A, 3A-3C) is sent to the brake control unit 74 (see FIGS. 3A-3C) and the wheel selection 50 (see FIGS. 3A-3C), to inhibit brakes 58 (see FIG. 2A) on a pair 48 of wheels 46 on the left main landing gear 24a. As shown in FIG. 4, during the active portion 202, the pair 48 of forward wheels 46c on the left main landing gear 24a is in the inhibited brakes-no brakes 214 brake state 208, and the pair 48 of aft wheels 46d on the left main landing gear 24a is in the brakes on 212 brake state 208. It is noted that the pair 48 of aft wheels 46d could be inhibited instead of the pair 48 of forward wheels 46c on the left main landing gear 24a, or other combinations of wheels 46, for example, diagonal wheels 46i (see FIG. 2A), one wheel 46, three wheels 46, or another suitable number of wheels.

As shown in FIG. 4, when the right pedal plot 220 goes above the maximum PTLA triggering brake pedal command threshold 122b transitioning from the active portion 202 to the second not active portion 204, the PTLA brake inhibit command 90 is deactivated, and in the second not active portion 204, the left pedal 218 is still held down and applied, and the right pedal 222 is applied, so that an all brakes applied state 226 results at the PTLA exit. As shown in FIG. 4, during the second not active portion 204, all of the wheels 46 on the left main landing gear 24a and on the right main landing gear 24b are in the brakes on 212 brake state 208.

Figure 5:
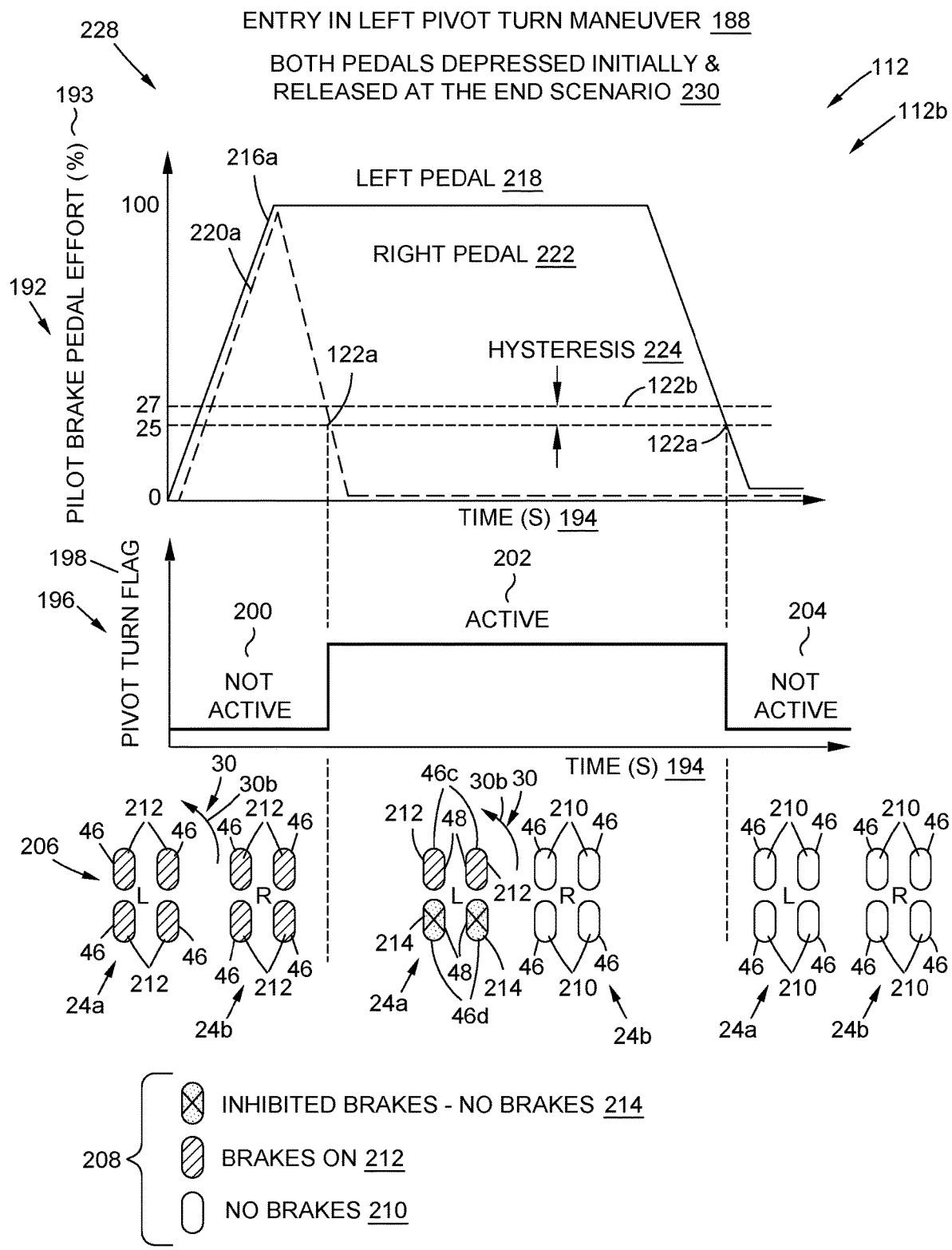
FIG. 5 is an illustration of a graph showing a second pivot turn brake pedal profile.

Now referring to FIG. 5, FIG. 5 is an illustration of a graph 228 showing a pivot turn brake pedal profile 112, in the form of an exemplary second pivot turn brake pedal profile 112b, where entry is made into a pivot turn maneuver 30, in the form of a left pivot turn maneuver 30b, for an entry in left pivot turn maneuver 188 with a both pedals depressed initially and released at the end scenario 230. As shown in FIG. 5, the graph 228 includes the first portion 192 with the pilot brake pedal effort 193 in percent (%) on the y-axis, and time 194 in seconds (s) on the x-axis. This percentage value corresponds to a normalized full brake pedal travel, for example, 0% is fully off the brake pedal, and 100% is the brake pedal fully depressed. As further shown in FIG. 5, the graph 228 includes the second portion 196 with the pivot turn flag 198 on the y-axis and also time 194 in seconds (s) on the x-axis, and the first not active portion 200, the active portion 202, and the second not active portion 204 along the x-axis. As further shown in FIG. 5, the graph 228 includes the third portion 206 showing brake states 208 of wheels 46 on the left main landing gear 24a and the right main landing gear 24b. As further shown in FIG. 5, the brake states 208 include no brakes 210, brakes on 212, and inhibited brakes-no brakes 214.

As shown in FIG. 5, the first portion 192 shows a left pedal plot 216a for the left pedal 218 and shows a right pedal plot 220a for the right pedal 222, through the first not active portion 200, the active portion 202, and the second not active portion 204, as the entry in left pivot turn maneuver 188 transitions into and out of a braked pivot turn. The first portion 192 further shows hysteresis 224 with the minimum PTLA triggering brake pedal command threshold 122a and the maximum PTLA triggering brake pedal command threshold 122b.

As shown in FIG. 5, during the first not active portion 200, the left pedal 218 and the right pedal 220 are both initially depressed and the wheels 46 of the left main landing gear 24a and the right main landing gear 24b are in the brakes on 212 brake state 208. As further shown in FIG. 5, during the active portion 202, the left pedal 218 is held down, and the right pedal 222 is released, and the wheels 46 of the right main landing gear 24b are in the no brakes 210 brake state 208. As shown in FIG. 5, when the right pedal plot 220a falls below the minimum PTLA triggering brake pedal command threshold 122a transitioning from the first not active portion 200 to the active portion 202 (and the average wheel speed 102 (see FIG. 2A) is less than the PTLA speed threshold 104 (see FIG. 2A)), the PTLA brake inhibit command 90 is activated and PTLA is entered, and the PTLA brake inhibit command 90 (see FIGS. 2A, 3A-3C) is sent to the brake control unit 74 (see FIGS. 3A-3C) and the wheel selection 50 (see FIGS. 3A-3C), to inhibit brakes 58 (see FIG. 2A) on a pair 48 of wheels 46 on the left main landing gear 24a. As shown in FIG. 5, during the active portion 202, the pair 48 of aft wheels 46d on the left main landing gear 24a is in the inhibited brakes-no brakes 214 brake state 208, and the pair 48 of forward wheels 46c on the left main landing gear 24a is in the brakes on 212 brake state 208. It is noted that the pair 48 of forward wheels 46c could be inhibited instead of the pair 48 of aft wheels 46d on the left main landing gear 24a, or other combinations of wheels 46, for example, diagonal wheels 46i (see FIG. 2A), one wheel 46, three wheels 46, or another suitable number of wheels.

As shown in FIG. 5, when the left pedal plot 216a goes below the minimum PTLA triggering brake pedal command threshold 122a transitioning from the active portion 202 to the second not active portion 204, the PTLA brake inhibit command 90 is deactivated, and in the second not active portion 204, the left pedal 218 is released, and the right pedal 222 remains released, so that all of the wheels 46 on the left main landing gear 24a and on the right main landing gear 24b are in the no brakes 210 brake state 208 at the PTLA exit.

Figure 6:
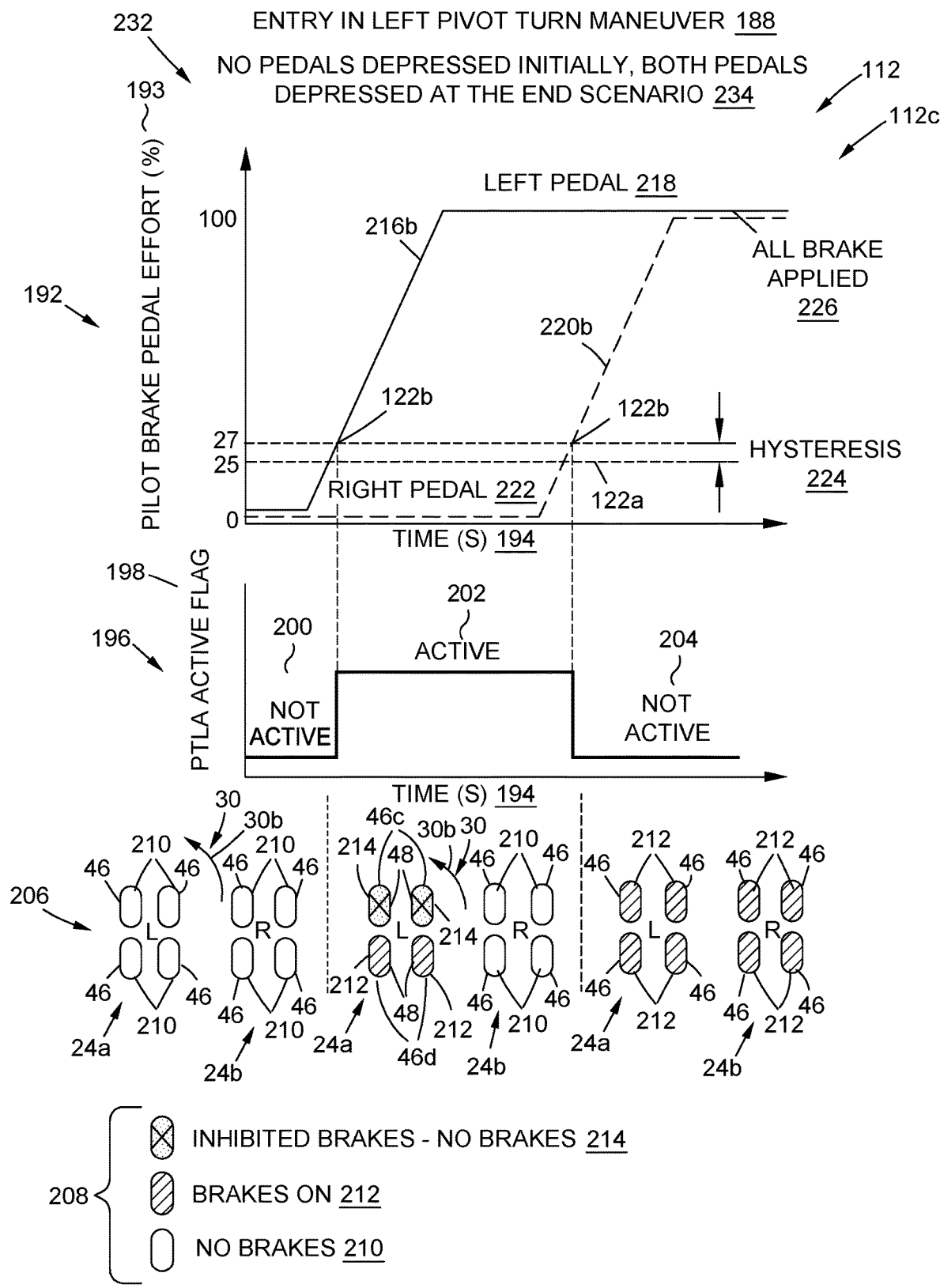
FIG. 6 is an illustration of a graph showing a third pivot turn brake pedal profile.

Now referring to FIG. 6, FIG. 6 is an illustration of a graph 232 showing a pivot turn brake pedal profile 112, in the form of an exemplary third pivot turn brake pedal profile 112c, where entry is made into a pivot turn maneuver 30, in the form of a left pivot turn maneuver 30b, for an entry in left pivot turn maneuver 188 with a no pedals depressed initially and both pedals depressed at the end scenario 234. As shown in FIG. 6, the graph 232 includes the first portion 192 with the pilot brake pedal effort 193 in percent (%) on the y-axis, and time 194 in seconds (s) on the x-axis. This percentage value corresponds to a normalized full brake pedal travel, for example, 0% is fully off the brake pedal, and 100% is the brake pedal fully depressed. As further shown in FIG. 6, the graph 232 includes the second portion 196 with the pivot turn flag 198 on the y-axis and also time 194 in seconds (s) on the x-axis, and the first not active portion 200, the active portion 202, and the second not active portion 204 along the x-axis. As further shown in FIG. 6, the graph 228 includes the third portion 206 showing brake states 208 of wheels 46 on the left main landing gear 24a and the right main landing gear 24b. As further shown in FIG. 6, the brake states 208 include no brakes 210, brakes on 212, and inhibited brakes-no brakes 214.

As shown in FIG. 6, the first portion 192 shows a left pedal plot 216b for the left pedal 218 and shows a right pedal plot 220b for the right pedal 222, through the first not active portion 200, the active portion 202, and the second not active portion 204, as the entry in left pivot turn maneuver 188 transitions into and out of a braked pivot turn. The first portion 192 further shows hysteresis 224 with the minimum PTLA triggering brake pedal command threshold 122a and the maximum PTLA triggering brake pedal command threshold 122b.

As shown in FIG. 6, during the first not active portion 200, the left pedal 218 and the right pedal 216 are both initially not depressed and the wheels 46 of the left main landing gear 24a and the right main landing gear 24b are in the no brakes 210 brake state 208. As further shown in FIG. 6, during the active portion 202, the left pedal 218 is applied and depressed, and the right pedal 222 is not applied and depressed, and the wheels 46 of the right main landing gear 24b are in the no brakes 210 brake state 208. As shown in FIG. 6, when the left pedal plot 216b goes above the maximum PTLA triggering brake pedal command threshold 122b transitioning from the first not active portion 200 to the active portion 202 (and the average wheel speed 102 (see FIG. 2A) is less than the PTLA speed threshold 104 (see FIG. 2A)), the PTLA brake inhibit command 90 is activated and PTLA is entered, and the PTLA brake inhibit command 90 (see FIGS. 2A, 3A-3C) is sent to the brake control unit 74 (see FIGS. 3A-3C) and the wheel selection 50 (see FIGS. 3A-3C), to inhibit brakes 58 (see FIG. 2A) on a pair 48 of wheels 46 on the left main landing gear 24a. As shown in FIG. 6, during the active portion 202, the pair 48 of forward wheels 46c on the left main landing gear 24a is in the inhibited brakes-no brakes 214 brake state 208, and the pair 48 of aft wheels 46d on the left main landing gear 24a is in the brakes on 212 brake state 208. It is noted that the pair 48 of aft wheels 46d could be inhibited instead of the pair 48 of forward wheels 46c on the left main landing gear 24a, or other combinations of wheels 46, for example, diagonal wheels 46i (see FIG. 2A), one wheel 46, three wheels 46, or another suitable number of wheels.

As shown in FIG. 6, when the right pedal plot 220b goes above the maximum PTLA triggering brake pedal command threshold 122b transitioning from the active portion 202 to the second not active portion 204, the PTLA brake inhibit command 90 is deactivated, and in the second not active portion 204, the left pedal 218 remains depressed and applied, and the right pedal 222 is depressed and applied, so that an all brakes applied state 226 results at the PTLA exit. As shown in FIG. 6, during the second not active portion 204, all of the wheels 46 on the left main landing gear 24a and on the right main landing gear 24b are in the brakes on 212 brake state 208.

Figure 7:
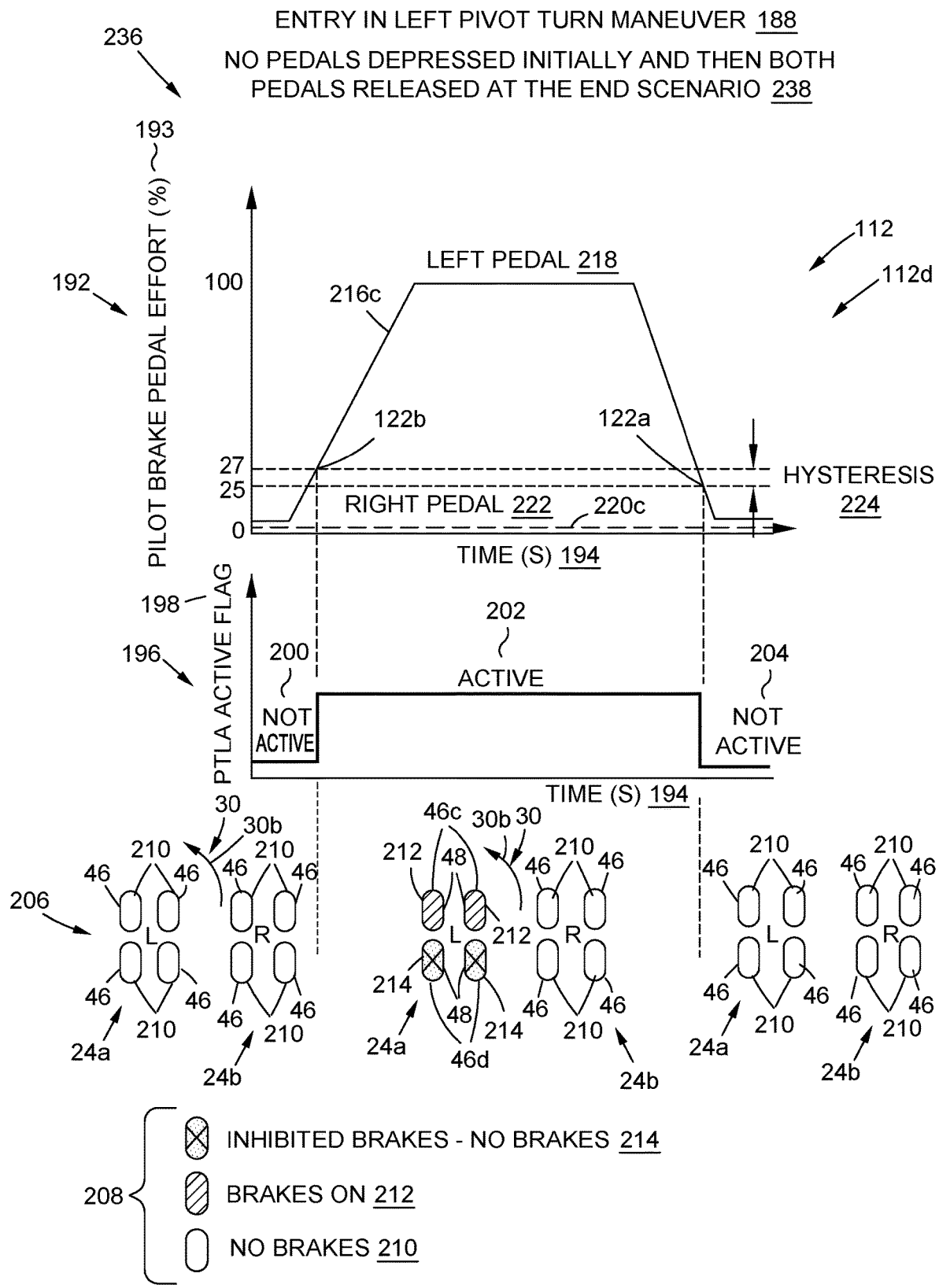
FIG. 7 is an illustration of a graph showing a fourth pivot turn brake pedal profile.

Now referring to FIG. 7, FIG. 7 is an illustration of a graph 236 showing a pivot turn brake pedal profile 112, in the form of an exemplary fourth pivot turn brake pedal profile 112d, where entry is made into a pivot turn maneuver 30, in the form of a left pivot turn maneuver 30b, for an entry in left pivot turn maneuver 188 with a no pedals depressed initially and then both pedals released at the end scenario 238. As shown in FIG. 7, the graph 232 includes the first portion 192 with the pilot brake pedal effort 193 in percent (%) on the y-axis, and time 194 in seconds (s) on the x-axis. This percentage value corresponds to a normalized full brake pedal travel, for example, 0% is fully off the brake pedal, and 100% is the brake pedal fully depressed. As further shown in FIG. 7, the graph 232 includes the second portion 196 with the pivot turn flag 198 on the y-axis and also time 194 in seconds (s) on the x-axis, and the first not active portion 200, the active portion 202, and the second not active portion 204 along the x-axis. As further shown in FIG. 7, the graph 228 includes the third portion 206 showing brake states 208 of wheels 46 on the left main landing gear 24a and the right main landing gear 24b. As further shown in FIG. 7, the brake states 208 include no brakes 210, brakes on 212, and inhibited brakes-no brakes 214.

As shown in FIG. 7, the first portion 192 shows a left pedal plot 216c for the left pedal 218 and shows a right pedal plot 220c for the right pedal 222, through the first not active portion 200, the active portion 202, and the second not active portion 204, as the entry in left pivot turn maneuver 188 transitions into and out of a braked pivot turn. The first portion 192 further shows hysteresis 224 with the minimum PTLA triggering brake pedal command threshold 122a and the maximum PTLA triggering brake pedal command threshold 122b.

As shown in FIG. 7, during the first not active portion 200, the left pedal 218 and the right pedal 220 are both initially not depressed and the wheels 46 of the left main landing gear 24a and the right main landing gear 24b are in the no brakes 210 brake state 208. As further shown in FIG. 7, during the active portion 202, the left pedal 218 is applied and depressed, and the right pedal 222 is not applied and depressed, and the wheels 46 of the right main landing gear 24b are in the no brakes 210 brake state 208. As shown in FIG. 7, when the left pedal plot 216c goes above the maximum PTLA triggering brake pedal command threshold 122b transitioning from the first not active portion 200 to the active portion 202 (and the average wheel speed 102 (see FIG. 2A) is less than the PTLA speed threshold 104 (see FIG. 2A)), the PTLA brake inhibit command 90 is activated and PTLA is entered, and the PTLA brake inhibit command 90 (see FIGS. 2A, 3A-3C) is sent to the brake control unit 74 (see FIGS. 3A-3C) and the wheel selection 50 (see FIGS. 3A-3C), to inhibit brakes 58 (see FIG. 2A) on one or more but not all of the wheels 46, for example, to inhibit brakes 58 on a pair 48 of wheels 46, on the left main landing gear 24a. As shown in FIG. 7, during the active portion 202, the one or more but not all of the wheels 46, for example, the pair 48 of aft wheels 46d, on the left main landing gear 24a is in the inhibited brakes-no brakes 214 brake state 208, and the one or more but not all of the wheels 46, for example, the pair 48 of forward wheels 46c, on the left main landing gear 24a is in the brakes on 212 brake state 208. It is noted that the one or more but not all of the wheels 46, for example, the pair 48 of forward wheels 46c, could be inhibited instead of the one or more but not all of the wheels 46, for example, the pair 48 of aft wheels 46d, on the left main landing gear 24a, or other combinations of wheels 46, for example, diagonal wheels 46i (see FIG. 2A), one wheel 46, three wheels 46, or another suitable number of wheels.

As shown in FIG. 7, when the left pedal plot 216c goes below the minimum PTLA triggering brake pedal command threshold 122a transitioning from the active portion 202 to the second not active portion 204, the PTLA brake inhibit command 90 is deactivated, and in the second not active portion 204, the left pedal 218 is released, and the right pedal 222 remains released, so that all of the wheels 46 on the left main landing gear 24a and on the right main landing gear 24b are in the no brakes 210 brake state 208.

Figure 8:
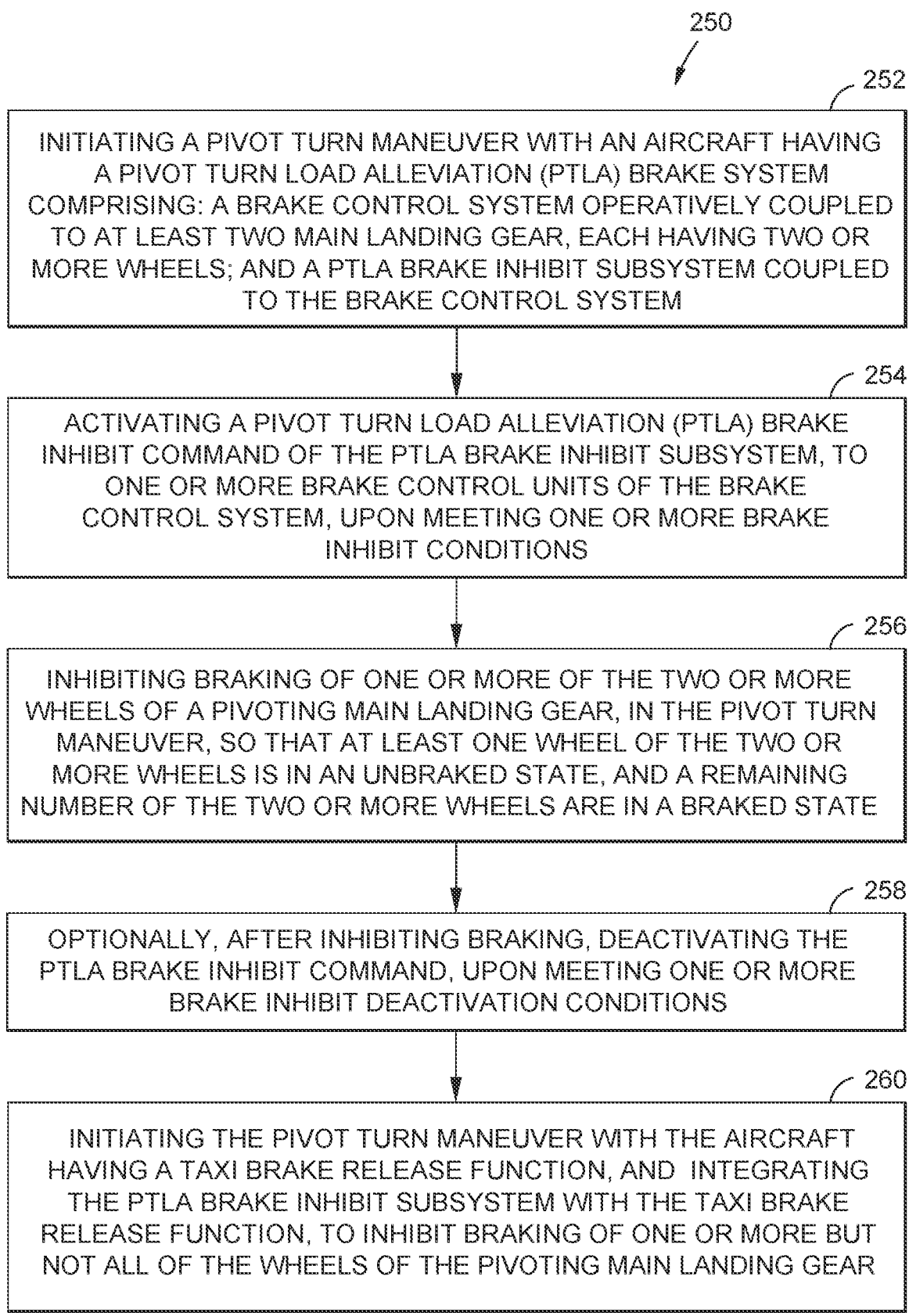
FIG. 8 is an illustration of a flow diagram showing an exemplary version of a method of the disclosure.

Now referring to FIG. 8, FIG. 8 is an illustration of a flow diagram showing an exemplary version of a method 250 of the disclosure. In another version of the disclosure, there is provided the method 250 (see FIG. 8) for alleviating structural loads 28a (see FIG. 2A) on a pivoting main landing gear 32 (see FIG. 2A) of an aircraft 10 (see FIGS. 1A-1B, 2A) in and during a pivot turn maneuver 30 (see FIG. 2A).

The blocks in FIG. 8 represent operations and/or portions thereof, and lines connecting the various blocks do not imply any particular order or dependency of the operations or portions thereof. FIG. 8 and the disclosure of the steps of the method 250, set forth herein, should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8, the method 250 comprises the step of initiating 252 the pivot turn maneuver 30 with the aircraft 10. The aircraft 10 has a pivot turn load alleviation (PTLA) brake system 12 (see FIGS. 1A-1B, 2A). As discussed in detail above, the PTLA brake system 12 comprises the brake control system 14 (see FIGS. 1A-1B, 2A) operatively coupled to at least two main landing gear 24 (see FIGS. 1A-1B, 2A). Each of the at least two main landing gear 24 has two or more wheels 46 (see FIGS. 1A-1B, 2A). For example, each main landing gear 24 may have two wheels, four wheels, six wheels, or another suitable number of wheels. The brake control system 14 controls braking of the at least two main landing gear 24. The PTLA brake system 12 further comprises the pivot turn load alleviation (PTLA) brake inhibit subsystem 16 (see FIGS. 1A-1B, 2A) coupled to the brake control system 14.

The step of initiating 252 (see FIG. 8) the pivot turn maneuver 30 with the aircraft 10, may further comprise initiating 252 the pivot turn maneuver 30 with the aircraft 10 having the PTLA brake system 12 with the brake control system 14 including a plurality of brake control units 74 (see FIG. 2A) and a plurality of brake control valves 82 (see FIG. 2A), wherein one of the plurality of brake control units 74 receives the PTLA brake inhibit command 90 (see FIG. 2A) from the PTLA brake inhibit subsystem 16, to inhibit generation of at least one brake command 76 (see FIG. 2A) to the at least one wheel 46.

As shown in FIG. 8, the method 250 further comprises the step of activating 254 a pivot turn load alleviation (PTLA) brake inhibit command 90 (see FIG. 2A) of the PTLA brake inhibit subsystem 16, to one or more brake control units 74 (see FIG. 2A) of the brake control system 14, upon meeting one or more brake inhibit conditions 94 (see FIG. 2A). The step of activating 254 (see FIG. 8) further comprises activating the PTLA brake inhibit command 90, upon meeting one or more of the brake inhibit conditions 94 comprising one or more of: (a) an on ground indication of the aircraft 96 (see FIG. 2A), when the aircraft 10 is in an on ground position 98 (see FIG. 2A); (b) an acceptable aircraft ground speed 100 (see FIG. 2A), when an aircraft ground speed 101 (see FIG. 2A) of the aircraft 10 is less than a pivot turn load alleviation (PTLA) speed threshold 104 (see FIG. 2A); or (c) a pivot turn load alleviation (PTLA) active flag command indication 106 (see FIG. 2A), generated by a monitoring logic 108 (see FIG. 2A) of the PTLA brake inhibit subsystem 16, to monitor brake pedal positions 110 (see FIG. 2A), to detect initiation 31 (see FIG. 2A) of the pivot turn maneuver 30 (see FIG. 2A), according to one of a plurality of pivot turn brake pedal profiles 112 (see FIGS. 2A, 4-7).

As shown in FIG. 8, the method 250 further comprises the step of inhibiting braking 256 of one or more of the two or more wheels 46 (see FIGS. 1A-1B, 2A) of the pivoting main landing gear 32, in the pivot turn maneuver 30, so that at least one wheel 46 of the two or more wheels 46 is in an unbraked state 52 (see FIG. 2A), and a remaining number 54 (see FIG. 2A) of the two or more wheels 46 are in a braked state 56 (see FIG. 2A). The PTLA brake system 12 alleviates the structural loads 28a on the pivoting main landing gear 32 of the aircraft 10 in the pivot turn maneuver 30, and reduces wear 136 (see FIG. 2A) on the at least one wheel 46 that is in the unbraked state 52.

The step of inhibiting braking 256 (see FIG. 8) may further comprises inhibiting braking 256 of one of, one wheel 46, two wheels 46, or three wheels 46, in the pivot turn maneuver 30 by the aircraft 10. The step of inhibiting braking 256 may further comprise inhibiting braking 256 of an inhibited wheel selection 50 (see FIG. 2A) of one or more but not all of the wheels 46, for example, one axle pair 48a (see FIG. 2A) of wheels 46, on the pivoting main landing gear 32, and with initiation 31 of a subsequent pivot turn maneuver 30a (see FIG. 2A), the inhibited wheel selection 50 of the one or more but not all of the wheels 46, for example, the one axle pair 48a of wheels 46, changes, in a sequential order 51 (see FIG. 2A), to a different one or more but not all of the wheels 46, for example, a different axle pair 48b (see FIG. 2A) of wheels 46.

As shown in FIG. 8, the method 250 may further optionally comprise, after the step of inhibiting braking 256, the step of deactivating 258 the PTLA brake inhibit command 90, upon meeting one or more brake inhibit deactivation conditions 118 (see FIG. 2A). As discussed above, the one or more brake inhibit deactivation conditions 118 comprise one or more of, (a) the aircraft ground speed 101 (see FIG. 2A) of the aircraft 10 exceeds the pivot turn load alleviation (PTLA) speed threshold 104 (see FIG. 2A); or (b) both a left brake pedal command 120a (see FIG. 2A) and a right brake pedal command 120b (see FIG. 2A) exceed a pivot turn load alleviation (PTLA) triggering brake pedal command threshold 122 (see FIG. 2A), for at least a predetermined time period 124 (see FIG. 2A); or (c) the aircraft 10 enters into an active parking brake state 126 (see FIG. 2A).

As shown in FIG. 8, the method 250 may further optionally comprise, initiating 252 the pivot turn maneuver 30 with the aircraft 10 having a taxi brake release function 130 (see FIG. 2A), and integrating 260 the PTLA brake inhibit subsystem 16 with the taxi brake release function 130 already present and existing in the aircraft 10, so that the taxi brake release function 130 selects a wheel selection 50 (see FIGS. 3A-3C) for the PTLA brake inhibit command 90 (see FIGS. 2A, 3A-3C), to inhibit braking of one or more but not all of the wheels 46 of the pivoting main landing gear 32.

Figure 9:
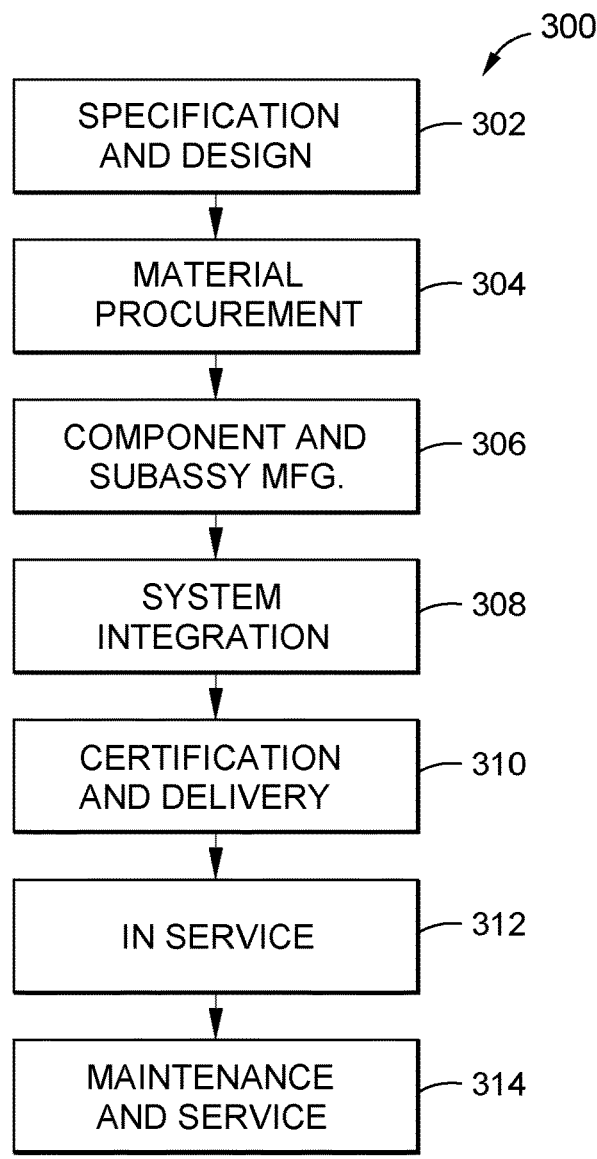
FIG. 9 is a flow diagram of a version of an aircraft manufacturing and service method.
Figure 10:
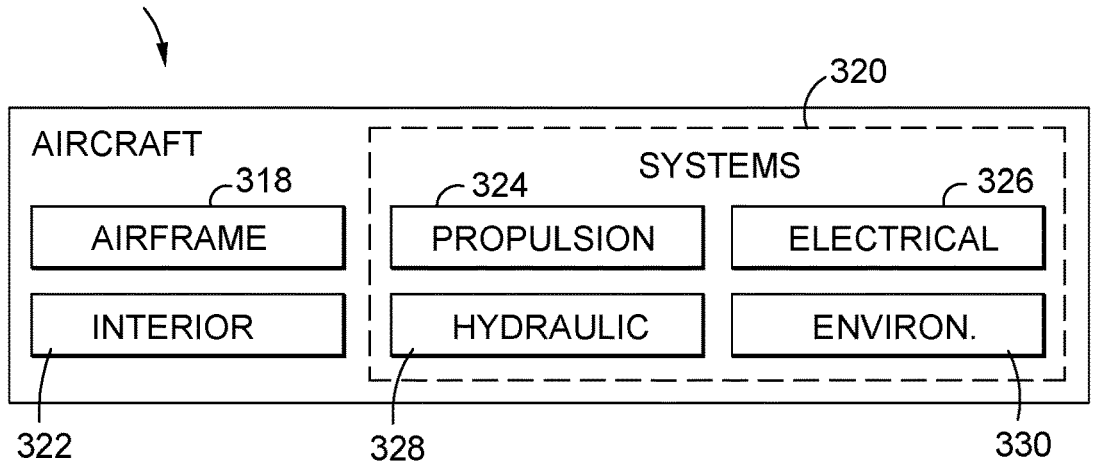
FIG. 10 is an illustration of a functional block diagram of a version of an aircraft.

Now referring to FIGS. 9 and 10, FIG. 9 is a flow diagram of an embodiment of an aircraft manufacturing and service method 300, and FIG. 10 is an illustration of a functional block diagram of an embodiment of an aircraft 316. Referring to FIGS. 9-10, versions of the disclosure may be described in the context of the aircraft manufacturing and service method 300, as shown in FIG. 9, and the aircraft 316, as shown in FIG. 10. During pre-production, the exemplary aircraft manufacturing and service method 300 (see FIG. 9) may include specification and design 302 (see FIG. 9) of the aircraft 316 (see FIG. 10) and material procurement 304 (see FIG. 9). During manufacturing, component and subassembly manufacturing 306 (see FIG. 9) and system integration 308 (see FIG. 9) of the aircraft 316 (see FIG. 10) takes place. Thereafter, the aircraft 316 (see FIG. 10) may go through certification and delivery 310 (see FIG. 9) in order to be placed in service 312 (see FIG. 9). While in service 312 (see FIG. 9) by a customer, the aircraft 316 (see FIG. 10) may be scheduled for routine maintenance and service 314 (see FIG. 9), which may also include modification, reconfiguration, refurbishment, and other suitable services.

Each of the processes of the aircraft manufacturing and service method 300 (see FIG. 9) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. As further shown in FIG. 10, examples of the systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 300 (see FIG. 9). For example, components or subassemblies corresponding to component and subassembly manufacturing 306 (see FIG. 9) may be fabricated or manufactured in a manner similar to components or subassemblies produced while the aircraft 316 (see FIG. 10) is in service 312 (see FIG. 9). Also, one or more method embodiments, system embodiments, or a combination thereof, may be utilized during component and subassembly manufacturing 306 (see FIG. 9) and system integration 308 (see FIG. 9), for example, by substantially expediting assembly of, or reducing the cost of, the aircraft 316 (see FIG. 10). Similarly, one or more of method versions, system versions, or a combination thereof, may be utilized while the aircraft 316 (see FIG. 10) is in service 312 (see FIG. 9), for example and without limitation, to maintenance and service 314 (see FIG. 9).

Disclosed versions of the PTLA brake system 12 (see FIGS. 1A-1B, 2A), and the method 250 (see FIG. 8) alleviate loads 28 (see FIG. 2A), such as structural loads 28*a* (see FIG. 2A) and torsional load reaction 28*b* (see FIG. 2A), or torque load, on a pivoting main landing gear 32 (see FIG. 2A) of an aircraft 10, in and during a pivot turn maneuver 30 (see FIG. 2A), by an aircraft 10, and reduces wear 136 on one or more wheels 46 of the pivoting main landing gear 32 having brakes 58 inhibited by the PTLA brake system 12, and reduces wear 136 on the tires of such wheels 46. Further, the PTLA brake system 12 inhibits braking on one or more brakes 58 on the pivoting main landing gear 32, in order to reduce torsional load reaction 28*b* (see FIG. 2A) exerted on the pivoting main landing gear 32. The loads 28 (see FIG. 2A), such as structural loads 28*a* (see FIG. 2A) and torsional load reaction 28*b* (see FIG. 2A), or torque load, on the pivoting main landing gear 32 (see FIG. 2A), are reduced because only a portion of the brakes 58, such as half of the brakes 58, are applied, and the other portion of the brakes 58, or other half of the brakes 58 are inhibited or unbraked. The PTLA brake system 12 provides load alleviation for 2-point turn maneuver or pivot turn maneuver 30.

Moreover, disclosed versions of the PTLA brake system 12 (see FIGS. 1A-1B, 2A), and the method 250 (see FIG. 8) may also reduce cornering forces 134 (see FIG. 2A), which, in turn, also reduce wear 136. The PTLA brake system 12 may also provide U-turn optimization 138 (see FIG. 2A), when the inboard wheels 46*e* (see FIG. 2A) are released. An additional advantage of the PTLA brake system 12 may also be to reduce the overall weight of the main landing gear 24 because with reduced structural loads 28*a* and reduced cornering forces 134, various components and material on the main landing gear 24 may be reduced or eliminated, for example, a smaller, reduced weight scissor link, a smaller, reduced weight torque link, or another downsized structure on the main landing gear 24, such as the pivoting main landing gear 32. Moreover, the PTLA brake system 12 reduces brake load during a brake pivoting maneuver, or pivot turn maneuver 30, by an aircraft 10 having a 2-main landing gear configuration 36 (see FIG. 1A) to take advantage of individual wheel brake control.

In addition, disclosed versions of the PTLA brake system 12 (see FIGS. 1A-1B, 2A), and the method 250 (see FIG. 8) provide for integration with a taxi brake release function 130 (see FIG. 2A) that may be already existing or present on an aircraft 10, to obtain a taxi brake release function integration 132 (see FIG. 2A). The taxi brake release function 130 selects a predetermined one or more but not all of the wheels 46, for example, a pair of wheels 46, when making a wheel selection 50 (see FIGS. 3A-3C), and the PTLA brake inhibit command 90 uses that wheel selection 50 to assist the brake control unit 74, to inhibit braking of one or more but not all of the wheels 46, for example, the pair 48 of wheels 46, of the pivoting main landing gear 32.

Further, one disclosed version of the PTLA brake system 12 (see FIGS. 1A-1B, 2A), and the method 250 (see FIG. 8) provides for an axle pair 48*a* of wheels 46 that are side-by-side and share a common axle 49 (see FIG. 2A) between them. A paired axle release approach having two wheels 46 that share an axle 49, on a four wheel 46, two axle 49 main landing gear 24, is one exemplary scheme or arrangement, where half of the wheels 46 are unbraked and inhibited by the PTLA brake system 12, and the other half of the wheels 46 are braked during the pivot turn maneuver 30. The PTLA brake system 12 logic may alternate between the pair 48 of forward wheels 46*c* inhibited and the pair 48 of aft wheels 46*d* inhibited on the pivoting main landing gear 32 (see FIG. 2A). It is noted that the PTLA brake system 12 may also inhibit braking of one wheel 46, two wheels 46, three wheels 46, or another suitable number of wheels 46 in the pivot turn maneuver 30 performed by the aircraft 10.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. A pivot turn load alleviation (PTLA) brake system for alleviating structural loads on a pivoting main landing gear of an aircraft in a pivot turn maneuver, the PTLA brake system comprising:

a brake control system operatively coupled to at least two main landing gear, each of the at least two main landing gear having two or more wheels, wherein the brake control system controls braking of the at least two main landing gear;

a pivot turn load alleviation (PTLA) brake inhibit subsystem coupled to the brake control system, wherein the PTLA brake inhibit subsystem inhibits braking of one or more of the two or more wheels of one main landing gear comprising the pivoting main landing gear, in the pivot turn maneuver, so that at least one wheel of the two or more wheels is in an unbraked state, and a remaining number of the two or more wheels are in a braked state, and wherein the PTLA brake inhibit subsystem uses aircraft data and threshold values to determine which brakes to apply and which brakes to inhibit; and a taxi brake release function, wherein the PTLA brake inhibit subsystem is integrated with the taxi brake release function, so that the taxi brake release function selects a wheel selection for a pivot turn load alleviation (PTLA) brake inhibit command, to inhibit braking of one or more but not all of the wheels of the pivoting main landing gear, wherein the PTLA brake system alleviates the structural loads on the pivoting main landing gear of the aircraft in the pivot turn maneuver, and reduces wear on the at least one wheel that is in the unbraked state.

2. The PTLA brake system of claim 1, wherein the at least two main landing gear comprise a left main landing gear and a right main landing gear, each having two pairs of wheels, each pair of wheels disposed on an axle.

3. The PTLA brake system of claim 1, wherein the at least two main landing gear comprise one of, a 2-main landing gear configuration, a 3-main landing gear configuration, or a 4-main landing gear configuration.

4. The PTLA brake system of claim 1, wherein the pivoting main landing gear has four wheels, and the PTLA brake inhibit subsystem inhibits braking of one of, one wheel, two wheels, or three wheels, in the pivot turn maneuver by the aircraft.

5. The PTLA brake system of claim 1, wherein the PTLA brake inhibit subsystem inhibits braking, via activation of the PTLA brake inhibit command, to one or more brake control units of the brake control system, upon meeting one or more brake inhibit conditions.

6. The PTLA brake system of claim 5, wherein the one or more brake inhibit conditions comprise one or more of:
(a) an on ground state of the aircraft, when the aircraft is in an on ground position;
(b) an acceptable aircraft ground speed, when an aircraft ground speed of the aircraft is less than a pivot turn load alleviation (PTLA) speed threshold; or
(c) a pivot turn load alleviation (PTLA) active flag command indication, generated by a monitoring logic of the PTLA brake inhibit subsystem, to monitor brake pedal positions, to detect initiation of the pivot turn maneuver, according to one of a plurality of pivot turn brake pedal profiles.

7. The PTLA brake system of claim 5, wherein the PTLA brake inhibit command is deactivated upon meeting one or more brake inhibit deactivation conditions comprising one or more of:
(a) an aircraft ground speed of the aircraft exceeds a pivot turn load alleviation (PTLA) speed threshold;
(b) both a left brake pedal command and a right brake pedal command exceed a pivot turn load alleviation (PTLA) triggering brake pedal command threshold, for at least a predetermined time period; or
(c) the aircraft enters into an active parking brake state.

8. The PTLA brake system of claim 5, wherein upon meeting one or more of the brake inhibit conditions, the PTLA brake inhibit command is activated to inhibit braking of a wheel selection of one axle pair of wheels on the pivoting main landing gear, and with initiation of a subsequent pivot turn maneuver, the wheel selection of the one axle pair of wheels changes, in a sequential order, to a different axle pair of wheels.

9. The PTLA brake system of claim 5, wherein the one or more brake control units receive the PTLA brake inhibit command from the PTLA brake inhibit subsystem, and inhibit generation of at least one brake command corresponding to at least one of a plurality of brake control valves coupled to the at least one wheel that is in the unbraked state.

10. The PTLA brake system of claim 1, wherein during the pivot turn maneuver, one of the main landing gear is braked, and another of the main landing gear moves circumferentially about the braked main landing gear.

11. An aircraft comprising:
a fuselage;
one or more wings attached to the fuselage;
a plurality of landing gear attached to the fuselage, the plurality of landing gear comprising a nose landing gear, and at least two main landing gear, each of the at least two main landing gear having two or more wheels, wherein during a pivot turn maneuver by the aircraft, one of the at least two main landing gear comprises a pivoting main landing gear; and
a pivot turn load alleviation (PTLA) brake system comprising:
a brake control system operatively coupled to the at least two main landing gear, wherein the brake control system controls braking of the at least two main landing gear;
a pivot turn load alleviation (PTLA) brake inhibit subsystem coupled to the brake control system, wherein the PTLA brake inhibit subsystem inhibits braking of one or more of the two or more wheels of one main landing gear comprising the pivoting main landing gear, during the pivot turn maneuver, so that at least one wheel of the two or more wheels is in an unbraked state, and a remaining number of the two or more wheels are in a braked state, and wherein the PTLA brake inhibit subsystem uses aircraft data and threshold values to determine which brakes to apply and which brakes to inhibit; and
a taxi brake release function, wherein the PTLA brake inhibit subsystem is integrated with the taxi brake release function, so that the taxi brake release function selects a wheel selection for a pivot turn load alleviation (PTLA) brake inhibit command, to inhibit braking of one or more but not all of the wheels of the pivoting main landing gear,
wherein the PTLA brake system alleviates structural loads on the pivoting main landing gear, during the pivot turn maneuver by the aircraft, and reduces wear on the at least one wheel that is in the unbraked state.

12. The aircraft of claim 11, wherein during the pivot turn maneuver, one of the main landing gear is braked, and another of the main landing gear moves circumferentially about the braked main landing gear.

13. The aircraft of claim 11, wherein the PTLA brake inhibit subsystem inhibits braking, via activation of the PTLA brake inhibit command, to one or more brake control units of the brake control system, upon detection of one or more brake inhibit conditions comprising one or more of:
  (a) an on ground state of the aircraft, when the aircraft is in an on ground position;
  (b) an acceptable aircraft ground speed, when an aircraft ground speed of the aircraft is less than a pivot turn load alleviation (PTLA) speed threshold; or
  (c) a pivot turn load alleviation (PTLA) active flag command indication, generated by a monitoring logic of the PTLA brake inhibit subsystem, to monitor brake pedal positions, to detect initiation of the pivot turn maneuver, according to one of a plurality of pivot turn brake pedal profiles.

14. The aircraft of claim 13, wherein the PTLA brake inhibit command is deactivated upon meeting one or more brake inhibit deactivation conditions comprising one or more of:
  (a) the aircraft ground speed of the aircraft exceeds the pivot turn load alleviation (PTLA) speed threshold;
  (b) both a left brake pedal command and a right brake pedal command exceed a pivot turn load alleviation (PTLA) triggering brake pedal command threshold, for at least a predetermined time period; or
  (c) the aircraft enters into an active parking brake state.

15. A method for alleviating structural loads on a pivoting main landing gear of an aircraft in a pivot turn maneuver, the method comprising the steps of:
  initiating the pivot turn maneuver with the aircraft, the aircraft having a pivot turn load alleviation (PTLA) brake system comprising:
    a brake control system operatively coupled to at least two main landing gear, each of the at least two main landing gear having two or more wheels, wherein the brake control system controls braking of the at least two main landing gear;
    a pivot turn load alleviation (PTLA) brake inhibit subsystem coupled to the brake control system, wherein the PTLA brake inhibit subsystem uses aircraft data and threshold values to determine which brakes to apply and which brakes to inhibit; and
    a taxi brake release function, wherein the PTLA brake inhibit subsystem is integrated with the taxi brake release function, so that the taxi brake release function selects a wheel selection for a pivot turn load alleviation (PTLA) brake inhibit command, to inhibit braking of one or more but not all of the wheels of the pivoting main landing gear;
  activating the PTLA brake inhibit command of the PTLA brake inhibit subsystem, to one or more brake control units of the brake control system, upon meeting one or more brake inhibit conditions; and
  inhibiting braking of one or more of the two or more wheels of the pivoting main landing gear, in the pivot turn maneuver, so that at least one wheel of the two or more wheels is in an unbraked state, and a remaining number of the two or more wheels are in a braked state,
  wherein the PTLA brake system alleviates the structural loads on the pivoting main landing gear of the aircraft in the pivot turn maneuver, and reduces wear on the at least one wheel that is in the unbraked state.

16. The method of claim 15, wherein activating the PTLA brake inhibit command of the PTLA brake inhibit subsystem, further comprises activating the PTLA brake inhibit command of the PTLA brake inhibit subsystem, upon meeting one or more of the brake inhibit conditions comprising one or more of:
  (a) an on ground state of the aircraft, when the aircraft is in an on ground position;
  (b) an acceptable aircraft ground speed, when an aircraft ground speed of the aircraft is less than a pivot turn load alleviation (PTLA) speed threshold; or
  (c) a pivot turn load alleviation (PTLA) active flag command indication, generated by a monitoring logic of the PTLA brake inhibit subsystem, to monitor brake pedal positions, to detect initiation of the pivot turn maneuver, according to one of a plurality of pivot turn brake pedal profiles.

17. The method of claim 15, further comprising, after the inhibiting braking, deactivating the PTLA brake inhibit command, upon meeting one or more brake inhibit deactivation conditions comprising one or more of:
  (a) an aircraft ground speed of the aircraft exceeds a pivot turn load alleviation (PTLA) speed threshold;
  (b) both a left brake pedal command and a right brake pedal command exceed a pivot turn load alleviation (PTLA) triggering brake pedal command threshold, for at least a predetermined time period; or
  (c) the aircraft enters into an active parking brake state.

18. The method of claim 15, wherein inhibiting braking further comprises, during the pivot turn maneuver, one of the main landing gear is braked, and another of the main landing gear moves circumferentially about the braked main landing gear.

19. The method of claim 15, wherein inhibiting braking further comprises, inhibiting braking of one of, one wheel, two wheels, or three wheels, in the pivot turn maneuver by the aircraft.

20. The method of claim 15, wherein inhibiting braking further comprises, inhibiting braking of a wheel selection of one axle pair of wheels on the pivoting main landing gear, and with initiation of a subsequent pivot turn maneuver, the inhibited wheel selection of the one axle pair of wheels changes, in a sequential order, to a different axle pair of wheels.

* * * * *